(12) United States Patent
McLaughlin et al.

(10) Patent No.: US 11,049,187 B2
(45) Date of Patent: *Jun. 29, 2021

(54) PROVING GROUND ASSISTED AUTOMATED MODEL

(71) Applicant: Hartford Fire Insurance Company, Hartford, CT (US)

(72) Inventors: Kelly J. McLaughlin, Cobalt, CT (US); Shane Eric Barnes, Avon, CT (US); Huimin Xiong, Longmeadow, MA (US)

(73) Assignee: Hartford Fire Insurance Company, Hartford, CT (US)

( * ) Notice: Subject to any disclaimer, the term of this patent is extended or adjusted under 35 U.S.C. 154(b) by 223 days.

This patent is subject to a terminal disclaimer.

(21) Appl. No.: 16/241,040

(22) Filed: Jan. 7, 2019

(65) Prior Publication Data
US 2019/0213686 A1    Jul. 11, 2019

Related U.S. Application Data

(63) Continuation of application No. 14/972,939, filed on Dec. 17, 2015, now Pat. No. 10,176,526.

(60) Provisional application No. 62/261,059, filed on Nov. 30, 2015.

(51) Int. Cl.
*G06Q 40/08* (2012.01)
(52) U.S. Cl.
CPC .................................. *G06Q 40/08* (2013.01)
(58) Field of Classification Search
CPC .................................................... G06Q 40/08
See application file for complete search history.

(56) References Cited

U.S. PATENT DOCUMENTS

| | | | |
|---|---|---|---|
| 5,970,464 A | 10/1999 | Apte et al. | |
| 6,912,502 B1 * | 6/2005 | Buddle | G06Q 10/10 705/7.41 |
| 7,668,776 B1 * | 2/2010 | Ahles | G06Q 40/08 705/38 |
| 8,275,707 B1 | 9/2012 | Boyd | |
| 8,504,456 B2 | 8/2013 | Griffin et al. | |

(Continued)

FOREIGN PATENT DOCUMENTS

WO    2012037441 A1    3/2012

*Primary Examiner* — Eric T Wong
(74) *Attorney, Agent, or Firm* — Howard IP Law Group, PC

(57) ABSTRACT

Mediums, apparatus, computer program code, and means may be provided to evaluate relative risks based at least in part on source inputs received via a distributed communication network by an automated back-end application computer server. According to some embodiments, the server may access a data store containing electronic files associated with a set of entities to retrieve, for each of a plurality of the entities in the set of entities, electronic files associated with that entity. The server may also retrieve structured data elements, unstructured data elements, and external, third-party data elements for that entity. The server may then execute an automated risk model to assign a risk score to that entity based on the electronic files, the structured data elements, the unstructured data elements, and the external, third-party data elements for that entity and transmit indications of the risk scores for the plurality of entities.

20 Claims, 19 Drawing Sheets

(56) References Cited

U.S. PATENT DOCUMENTS

| | | | |
|---|---|---|---|
| 8,655,687 B2 | 2/2014 | Zizzamia et al. | |
| 8,666,786 B1 | 3/2014 | Wirz et al. | |
| 2004/0215551 A1* | 10/2004 | Eder | G06Q 40/08 705/38 |
| 2004/0225535 A1* | 11/2004 | Bond, Jr. | G06Q 40/08 705/4 |
| 2005/0276401 A1* | 12/2005 | Madill, Jr. | G06Q 40/08 379/114.14 |
| 2007/0100669 A1* | 5/2007 | Wargin | G06Q 40/08 705/4 |
| 2008/0172257 A1* | 7/2008 | Bisker | G06Q 10/10 705/4 |
| 2010/0205015 A1* | 8/2010 | McGiffin | G06Q 40/00 705/4 |
| 2011/0131122 A1 | 6/2011 | Griffin et al. | |
| 2011/0131131 A1 | 6/2011 | Griffin et al. | |
| 2012/0150570 A1 | 6/2012 | Samad-Khan et al. | |
| 2012/0173289 A1* | 7/2012 | Pollard | G06Q 40/08 705/4 |
| 2012/0221357 A1* | 8/2012 | Krause | G06Q 40/08 705/4 |
| 2012/0271659 A1* | 10/2012 | Zizzamia | G06Q 40/025 705/4 |
| 2014/0244317 A1* | 8/2014 | Roberts | G06Q 40/08 705/4 |
| 2014/0330594 A1* | 11/2014 | Roberts | G06Q 10/06316 705/4 |
| 2015/0066772 A1 | 3/2015 | Griffin et al. | |

* cited by examiner

FIG. 17

PROVING GROUND ASSISTED AUTOMATED MODEL

CROSS-REFERENCE TO RELATED APPLICATIONS

The present application is a continuation of co-pending U.S. patent application Ser. No. 14/972,939 entitled "PROCESSING SYSTEM FOR DATA ELEMENTS RECEIVED VIA SOURCE INPUTS" filed Dec. 17, 2015, which claims the benefit of U.S. Provisional Patent Application No. 62/261,059 entitled "PROCESSING SYSTEM FOR DATA ELEMENTS RECEIVED VIA SOURCE INPUTS" and filed Nov. 30, 2015. The entire content of those applications is incorporated herein by reference for all purposes.

BACKGROUND

A set of entities may include different entities that are each associated with a different level of risk. For example, a first entity may pose a first degree of risk that is substantially higher as compared to a second entity that is associated with a second degree of risk. It may therefore be desirable to determine relative amounts of risk for each entity in a set. For example, determining that a particular entity is associated with an unusually high level of risk may allow remedial actions to be taken with respect to that entity. Determining this information, however, can be a time consuming and error prone task, especially where then are a substantially number of entities and when degrees of risk may depend on data elements from various source inputs of different types (e.g., structured source inputs, unstructured source inputs, third-party source inputs, etc.).

It would be desirable to provide systems and methods to process data elements received via source inputs in a way that provides faster, more accurate results and that allows for flexibility and effectiveness when responding to those results.

SUMMARY OF THE INVENTION

According to some embodiments, systems, methods, apparatus, computer program code and means are provided to process data elements received via source inputs in a way that provides faster, more accurate results and that allows for flexibility and effectiveness when responding to those results. A back-end application computer server may access a data store containing electronic files associated with a set of entities to retrieve, for each of a plurality of the entities in the set of entities, electronic files associated with that entity. The server may also retrieve structured data elements, unstructured data elements, and external, third-party data elements for that entity. The server may then execute an automated risk model to assign a risk score to that entity based on the electronic files, the structured data elements, the unstructured data elements, and the external, third-party data elements for that entity and transmit indications of the risk scores for the plurality of entities.

Some embodiments comprise: means for accessing a data store containing electronic files associated with a set of entities to retrieve, for each of a plurality of the entities in the set of entities, electronic files associated with that entity; means for retrieving structured data elements for that entity from a structured data element information source input; means for retrieving unstructured data elements for that entity from an unstructured data element information source input; means for retrieving external, third-party data elements for that entity from the external, third-party data element information source input; means for executing, by a computer processor of the back-end application computer server, an automated risk model to assign a risk score to that entity based on the electronic files, the structured data elements, the unstructured data elements, and the external, third-party data elements for that entity; and means for transmitting indications of the risk scores for the plurality of entities.

In some embodiments, a communication device associated with a back-end application computer server exchanges information with remote devices. The information may be exchanged, for example, via public and/or proprietary communication networks.

A technical effect of some embodiments of the invention is an improved and computerized ways to process data elements received via source inputs to provide faster, more accurate results and that allow for flexibility and effectiveness when responding to those results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 17 is an example of a book of business display of potential responses that might be presented in accordance with some embodiments.

DETAILED DESCRIPTION

The present invention provides significant technical improvements to facilitate dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of evaluating risk based on data element source inputs by providing technical benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third party systems, networks and subsystems. For example, in the present invention information may be transmitted from remote devices to a back-end application server and then analyzed accurately to evaluate levels of risk to improve the overall performance of the system.

Figure 1:
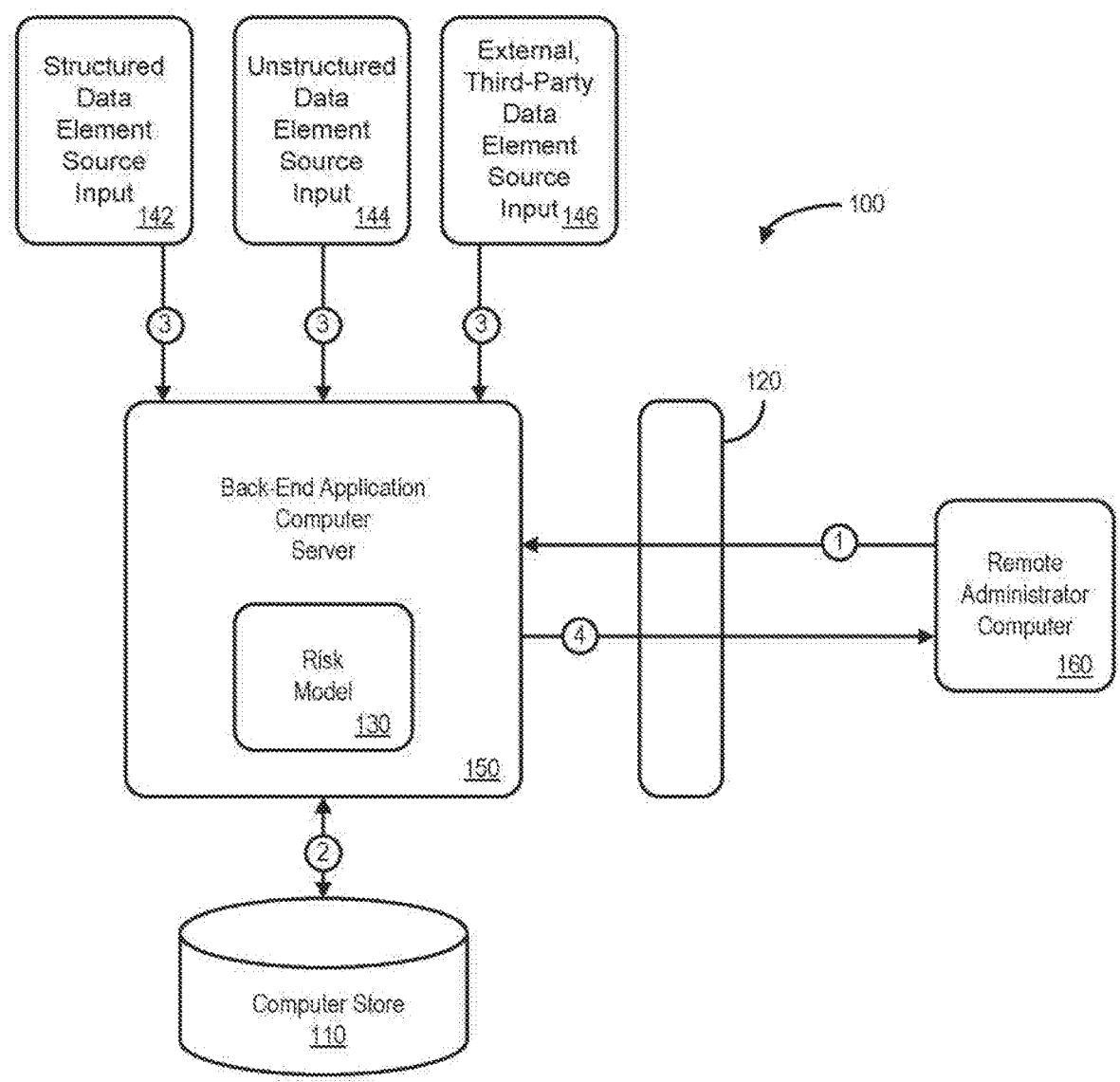
FIG. 1 is block diagram of a system according to some embodiments of the present invention.

Note that, in a computer system, different entities may each be associated with a different level of risk. For example, a first entity may pose a first degree of risk that is substantially higher as compared to a second entity that is associated with a second degree of risk. It may therefore be desirable to determine relative amounts of risk for each entity in a set. For example, determining that a particular entity is associated with an unusually high level of risk may allow remedial actions to be taken with respect to that entity. Determining this information, however, can be a time consuming and error prone task, especially where then are a substantially number of entities and when degrees of risk may depend on data elements from various source inputs of different types (e.g., structured source inputs, unstructured source inputs, third-party source inputs, etc.). It would be desirable to provide systems and methods to process data elements received via source inputs in a way that provides faster, more accurate results and that allows for flexibility and effectiveness when responding to those results. FIG. 1 is block diagram of a system 100 according to some embodiments of the present invention. In particular, the system 100 includes a back-end application computer server 150 that may access information in a computer store 110. The back-end application computer server 150 may also exchange information with a remote administrator computer 160 (e.g., via a firewall 120) and/or source inputs 142, 144, 146. According to some embodiments, a risk model 130 of the back-end application computer server 150 may facilitate the display of risk evaluation information via one or more remote administrator computers 160.

The back-end application computer server 150 might be, for example, associated with a Personal Computer ("PC"), laptop computer, smartphone, an enterprise server, a server farm, and/or a database or similar storage devices. According to some embodiments, an "automated" back-end application computer server 150 may facilitate the evaluation of risk associated with entities in the computer store 110. As used herein, the term "automated" may refer to, for example, actions that can be performed with little (or no) intervention by a human.

As used herein, devices, including those associated with the back-end application computer server 150 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the computer store 110. The computer store 110 might, for example, store data associated with a set of entities, each entity being associated with a different level of risk. The computer store 110 may also contain past and current interactions with source inputs 142, 144, 146 on historic entities. The computer store 110 may be locally stored or reside remote from the back-end application computer server 150. As will be described further below, the computer store 110 may be used by the back-end application computer server 150 to generate and/or calculate risk parameters that will be transmitted to the remote administrator computer 160. Although a single back-end application computer server 150 is shown in FIG. 1, any number of such devices may be included. Moreover, various devices described herein might be combined according to embodiments of the present invention. For example, in some embodiments, the back-end application computer server 150 and computer store 110 might be co-located and/or may comprise a single apparatus.

According to some embodiments, the system 100 may evaluate risk information over a distributed communication network via the automated back-end application computer server 150. For example, at (1) the remote administrator computer 160 may request that an automated risk analysis be performed. The back-end application computer server 150 may then determine information about a set of entities in the computer store 110 at (2) and collect data associated with the source inputs 142, 144, 146 at (3). In particular, data might be collected from a structured data element source input 142, an unstructured data element source input 144, and/or an external, third-party data element source input 146. The risk model 130 may then be executed and results may be provided to the remote administrator computer 160 at (4).

Figure 2:
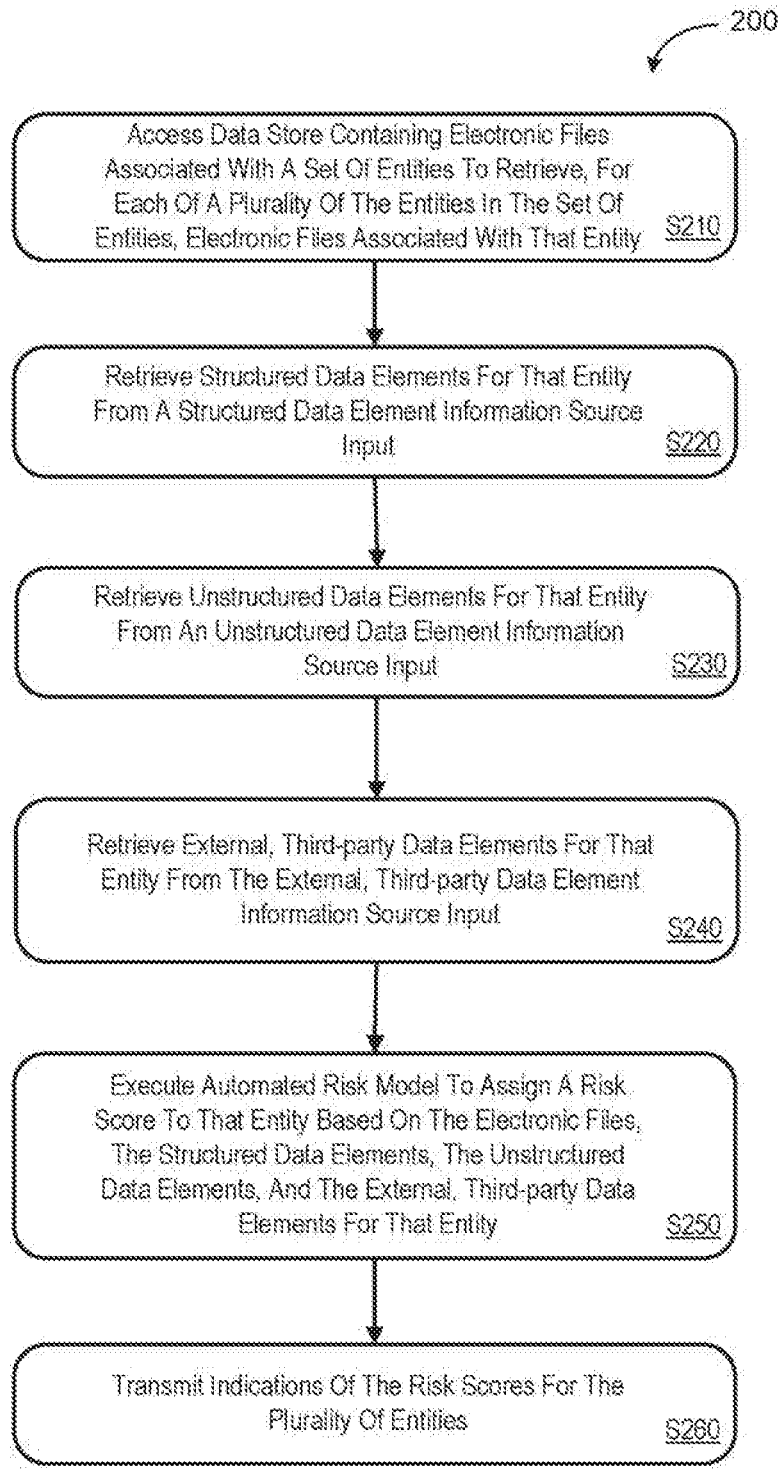
FIG. 2 illustrates a method according to some embodiments of the present invention.

Note that the system 100 of FIG. 1 is provided only as an example, and embodiments may be associated with additional elements or components. According to some embodiments, the elements of the system 100 evaluate risk over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a data store containing electronic files associated with a set of entities may be accessed to retrieve, for each of a plurality of entities in the set of entities, electronic files associated with that entity. According to some embodiments, the data store is associated with an insurer's book of business, and each entity in the data store comprises an insured party. Other embodiments might be associated with newly submitted policy requests, policy renewals, underwriting and pricing decisions, etc. Note that an insurer's book of business may cover or more types of insurance, including workers' compensation insurance, commercial automobile insurance, general liability insurance, property insurance, property casualty insurance, homeowners' insurance, personal lines of insurance, group benefits insurance, and/or life insurance. In some cases, not all of the entities in the computer store may be evaluated. For example, the plurality of insured parties may represent insured parties that do not satisfy a pre-determined threshold criteria indicating that a substantial potential loss is unlikely.

At S220, structured data elements may be retrieved for that entity from a structured data element information source input. The structured data elements might be, for example, associated with internally stored data elements about the insured party (e.g., claim notes store by the insurer) and/or governmental or regulatory data elements (e.g., indicating that an entity did, or did not, pass an inspection test).

At S230, unstructured data elements may be retrieved for that entity from an unstructured data element information source input. The unstructured data elements might be, for example, associated with web pages of the insured party (e.g., where the entity describes the operation of the business) and/or web pages mentioning the insured party (e.g., providing reviews of the goods or services provided by the entity).

At S240, external, third-party data elements may be retrieved for that entity from an external, third-party data element information source input. The external, third-party data elements might be, for example, associated with social media content (e.g., where people exchange text and images with each other).

At S250, a computer processor of a back-end application computer server may execute an automated risk model to assign a risk score to that entity based on the electronic files, the structured data elements, the unstructured data elements, and the external, third-party data elements for that entity. Note that the values associated with any of these data sources might comprise flags, set of flags, scores along a spectrum of risk, buckets collecting multiple values for a single account, etc. The risk score may, for example, represent a likelihood of a substantial potential loss for the insurer. The automated risk model may be executed, for example: when initiated by an administrator, responsive to a specific query submitted by the administrator (who might ask, for example, to see all risk information associated with drones), on a periodic basis, on a daily basis, on a weekly basis, on a monthly basis, and/or on a substantially continuous basis. In the case of risk model execution on a substantially continuous basis, the system may constantly extract information from relevant web pages, etc., in substantially real time and perform some degree of pre-processing on the data. In some cases, the results of this pre-processing might result in a warning flag or message being automatically routed to the administrator or a manager. According to some embodiments, prior to execution at t S250, the system may determine at least one variable associated with the automated risk model, the at least one variable being assigned a predictive quality based at least in part on an input frequency of the variable (e.g., as described with respect to FIG. 13). In this case, execution of the model may further be based at least in part on the automatically identified variable.

At S260, indications of the risk scores for the plurality of entities may be transmitted. According to some embodiments, the risk score comprises a numerical value for each insured party. According to other embodiments, the risk score is associated with a ranked list of insured parties. Note that a risk score might indicate, for example, that a policy will not be issued, that a policy will be issued, or that a manager having a particular level of experience or area of expertise will need to approve the insurance policy.

Figure 3:
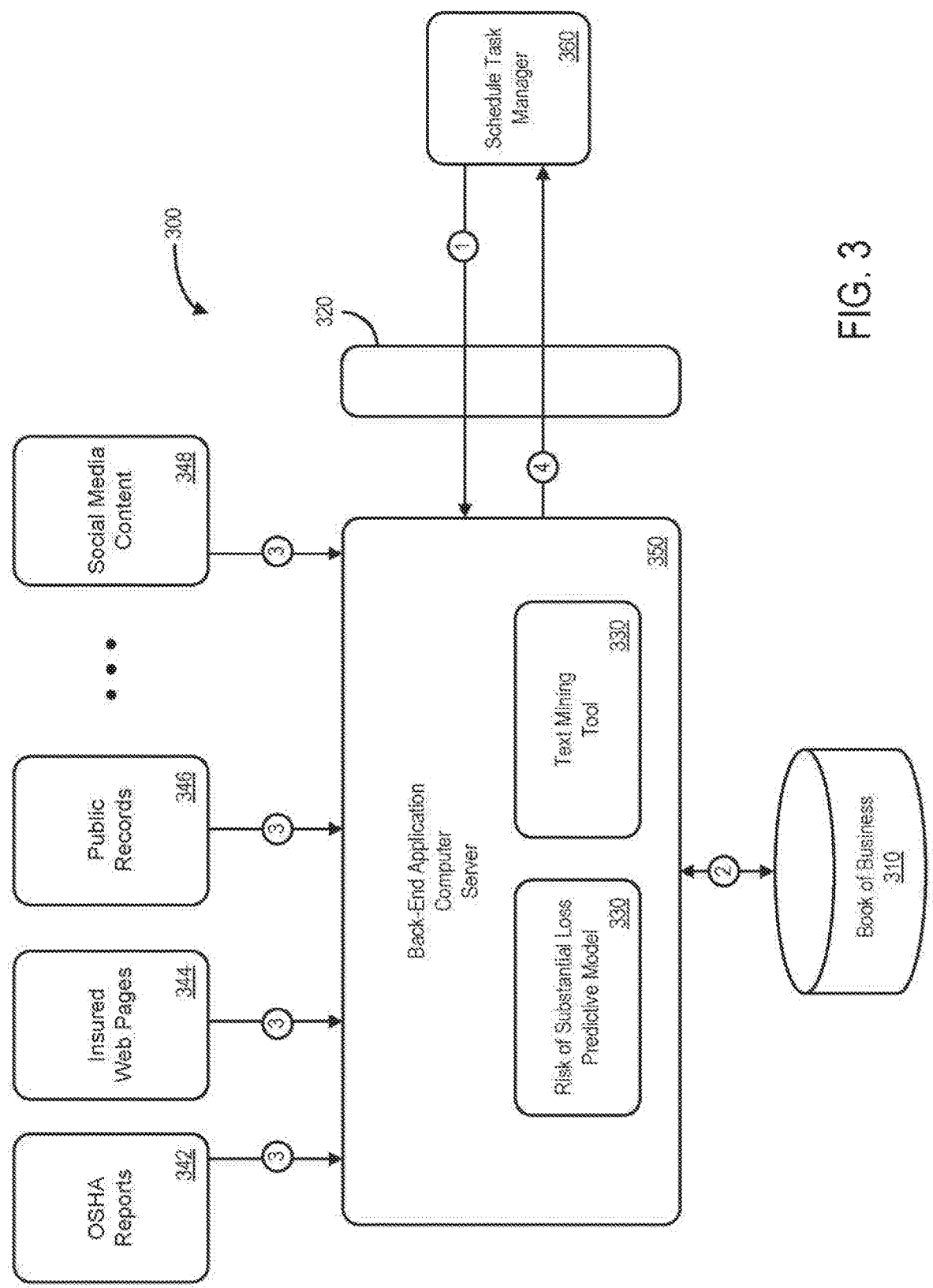
FIG. 3 is block diagram of a system in accordance with some embodiments of the present invention.

Some of the embodiments described herein may be implemented via an insurance enterprise system. For example, FIG. 3 is block diagram of a system 300 according to some embodiments of the present invention. As in FIG. 1, the system 300 includes a back-end application computer server 350 that may access information in a computer store 310. The back-end application computer server 350 may also exchange information with a remote administrator computer, a schedule task manager 360 (e.g., a manager 360 that automatically requests risk information on a weekly basis via a firewall 320), and/or source inputs 342, 344, 346, 348. According to some embodiments, a risk of substantial loss predictive model 330 and text mining tool 332 of the back-end application computer server 350 facilitates the transmission of risk information to the schedule task manager 360.

The back-end application computer server 350 might be, for example, associated with a PC, laptop computer, smartphone, an enterprise server, a server farm, and/or a database or similar storage devices. The back-end application computer server 350 may store information into and/or retrieve information from the computer store 310. The computer store 310 might, for example, store data associated with past and current insurance policies. The computer store 310 may be locally stored or reside remote from the back-end application computer server 350. As will be described further below, the computer store 310 may be used by the back-end application computer server 350 to generate and/or calculate risk parameters.

Figure 4:
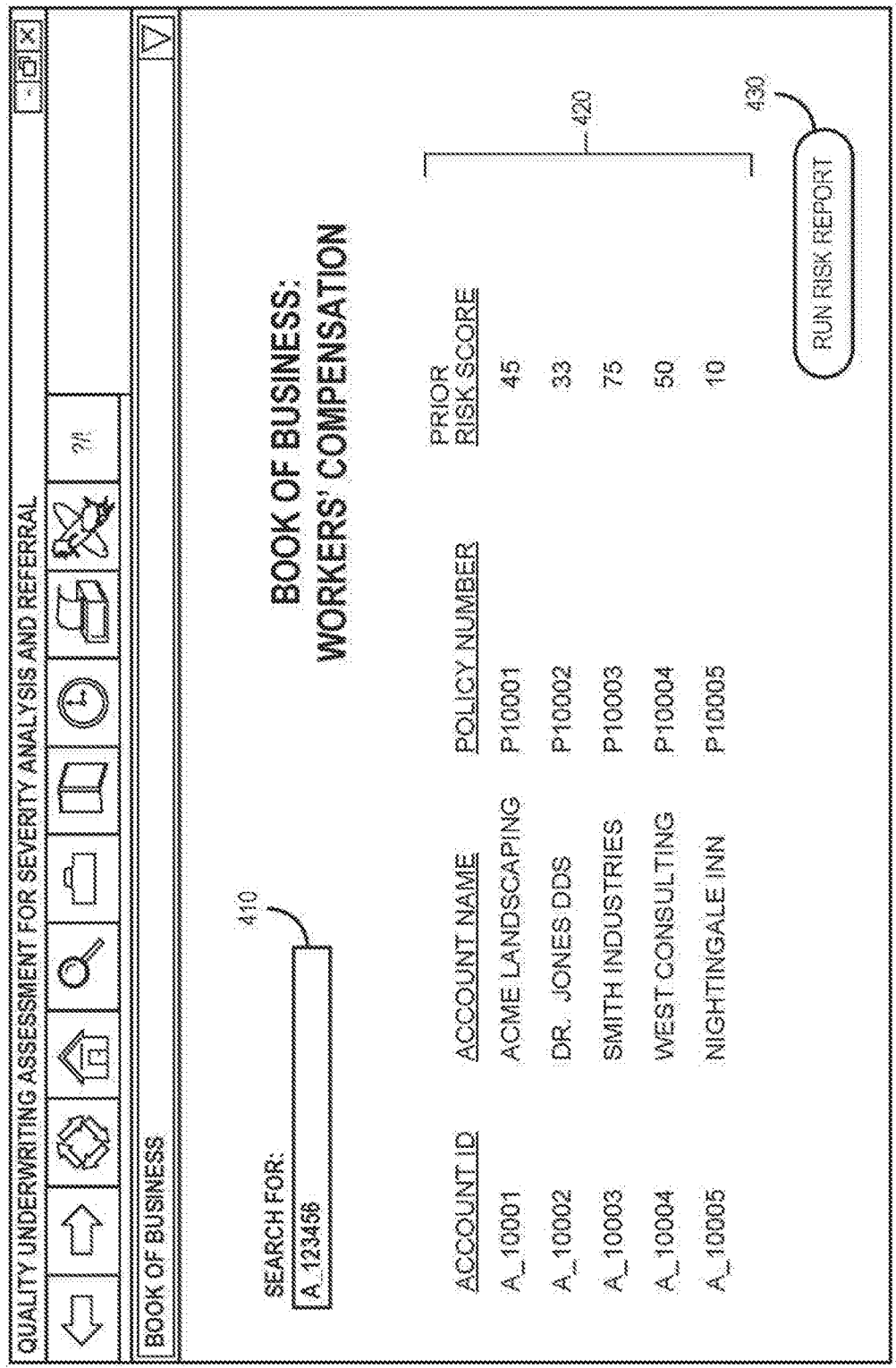
FIGS. 4 through 8 illustrate exemplary displays that might be associated with various embodiments described herein.

According to some embodiments, the system 300 may evaluate risk information over a distributed communication network via the automated back-end application computer server 350. For example, at (1) the remote schedule task manager 360 may request that an automated risk analysis be performed. The back-end application computer server may then determine information about a set of entities in the computer store 310 at (2). In particular, the entities may comprise insured parties in an insurer's book of business. Consider, for example, FIG. 4 which illustrates a display 400 of an insurer's book of business for a particular type of insurance (e.g., in this example, or the workers' compensation line of business). The display 400 may include a search function 410 to let an administrator locate a particular insured. The display 400 further includes details 420 about the insurer's book of business, including an account identifier, an account name, an insurance policy number, and a prior risk score for each account in the book. The display 400 may further include an icon 430 that may be selected by an administrator to request a risk report.

Figure 5:

Referring again to FIG. 3, the back-end application server 350 may then collect data associated with the source inputs 342, 344, 346, 348 at (3). In particular, data might be collected from a structured data element source input, such as governmental Occupational Safety and Health Administration ("OSHA") reports 342. Consider, for example, FIG. 5 which illustrates an OSHA violation web page display 500 or data source. Note that the data elements 510 in the display 500 may be "structured" in that various elements (e.g., a violation identifier, a company name, a date of violation, and/or a violation category) may be known to be located at pre-determined positions or locations within the display 500. In this way, the system may automatically match the company name of an insured (e.g., "Smith Industries") and use the associated violation information 520, including the violation category, when executing the risk model.

Figure 6A:
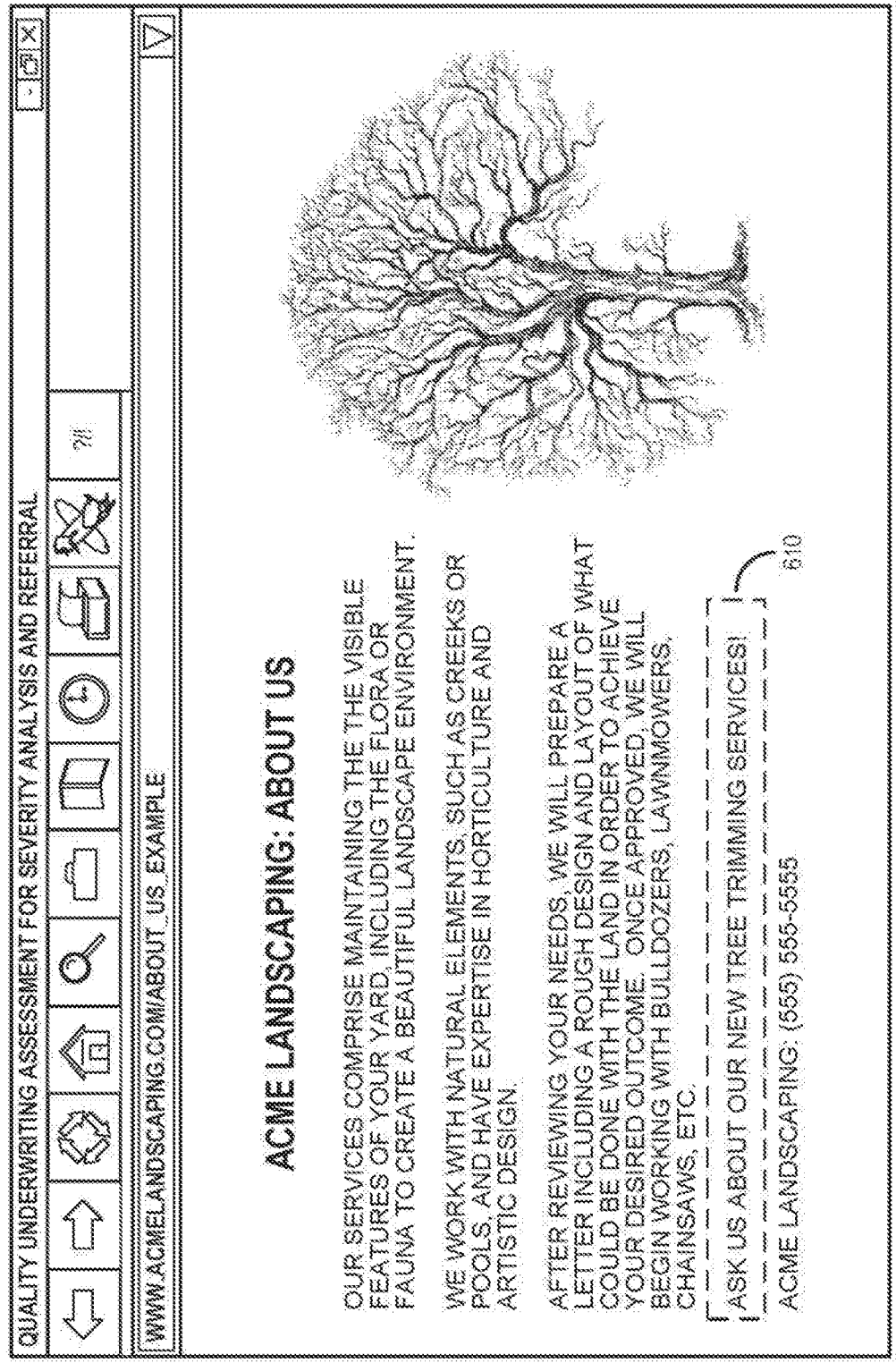
Figure 6B:
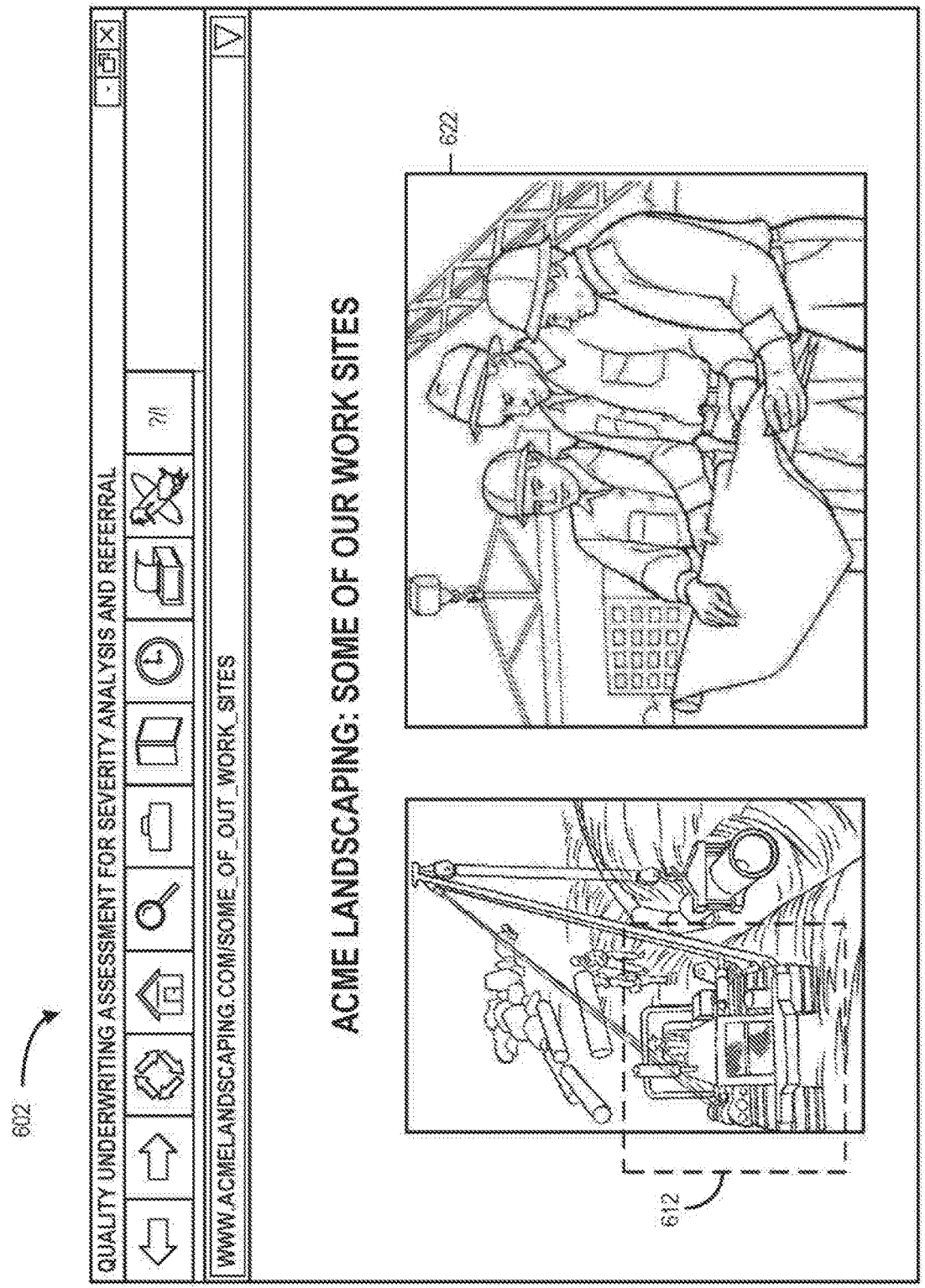
Figure 6C:
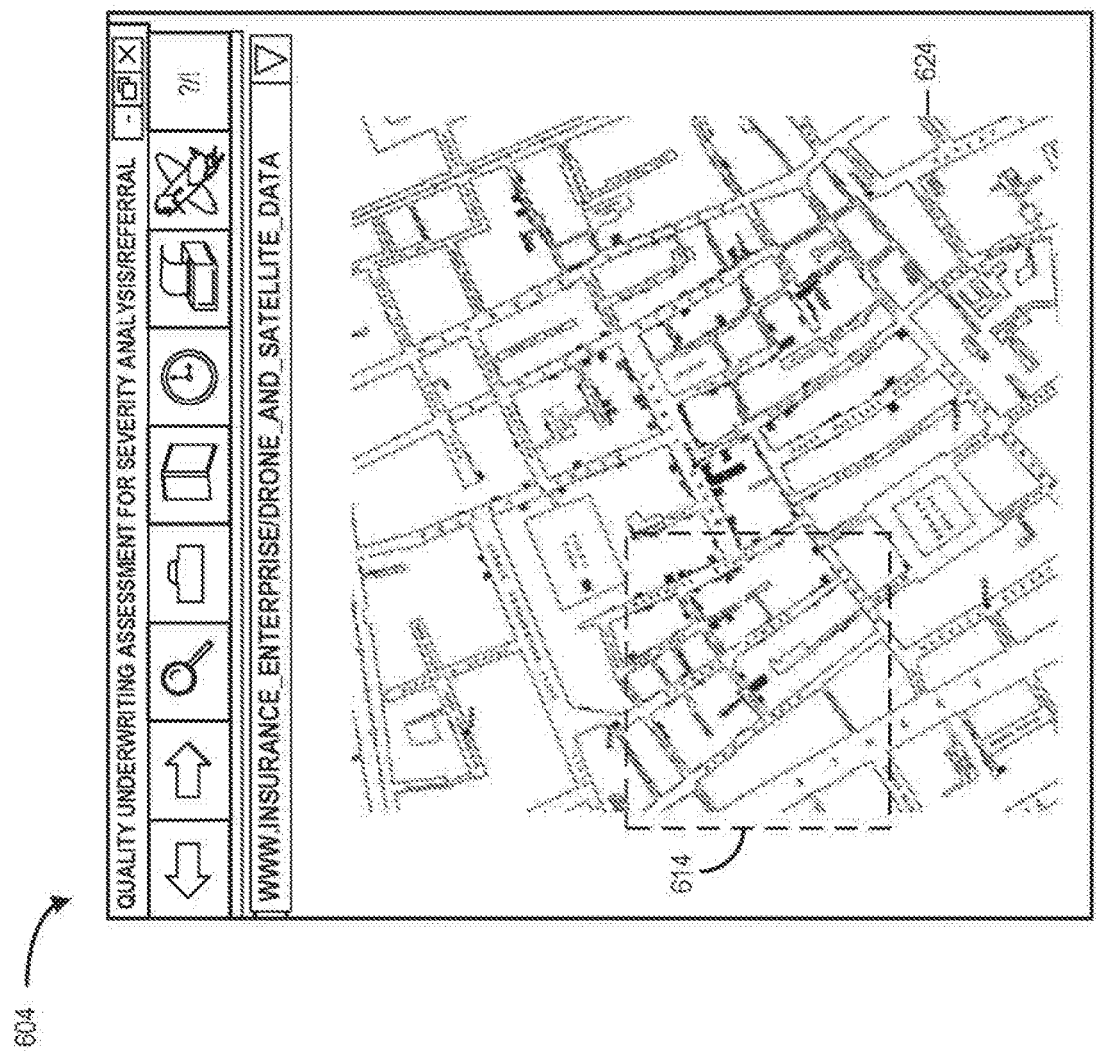

Referring again to FIG. 3, the back-end application computer server 350 may also collect information from an unstructured data element source input, such as one or more web pages run by the insured 344. Consider, for example, FIG. 6A which illustrates a web page display 600 maintained by an insured (Acme Landscaping). Note that the data elements in the display 600 may be "unstructured" in that various elements (e.g., text and images) may not be located at pre-determined positions or locations within the display 600. Instead, the system may automatically search for and discover risk related information (e.g., the fact that the company has a newly offered "tree trimming service") and use the detected information 610 when executing the risk model. Further note that the phrase "data element," as used herein, might refer to different types of information, including text information, image information (photographs and moving images), sound information (including speech and other types of audio information), etc. For example, FIG. 6B illustrates a display 602 including unstructured data elements 612, 622 other than text information. The system may, for example, examine the unstructured data elements 612, 622 looking for relevant risk information (e.g., the use of a particular type of construction tool, the lack of safety equipment, etc.). Similarly, FIG. 6C illustrates a display 604 with data elements 614, 624 that have been collected by an insurance enterprise (e.g., via drone or satellite images). The system may again examine the unstructured data elements 614, 624 looking for relevant risk information (e.g., work on a particular type of building that is considered especially dangerous).

Figure 7:
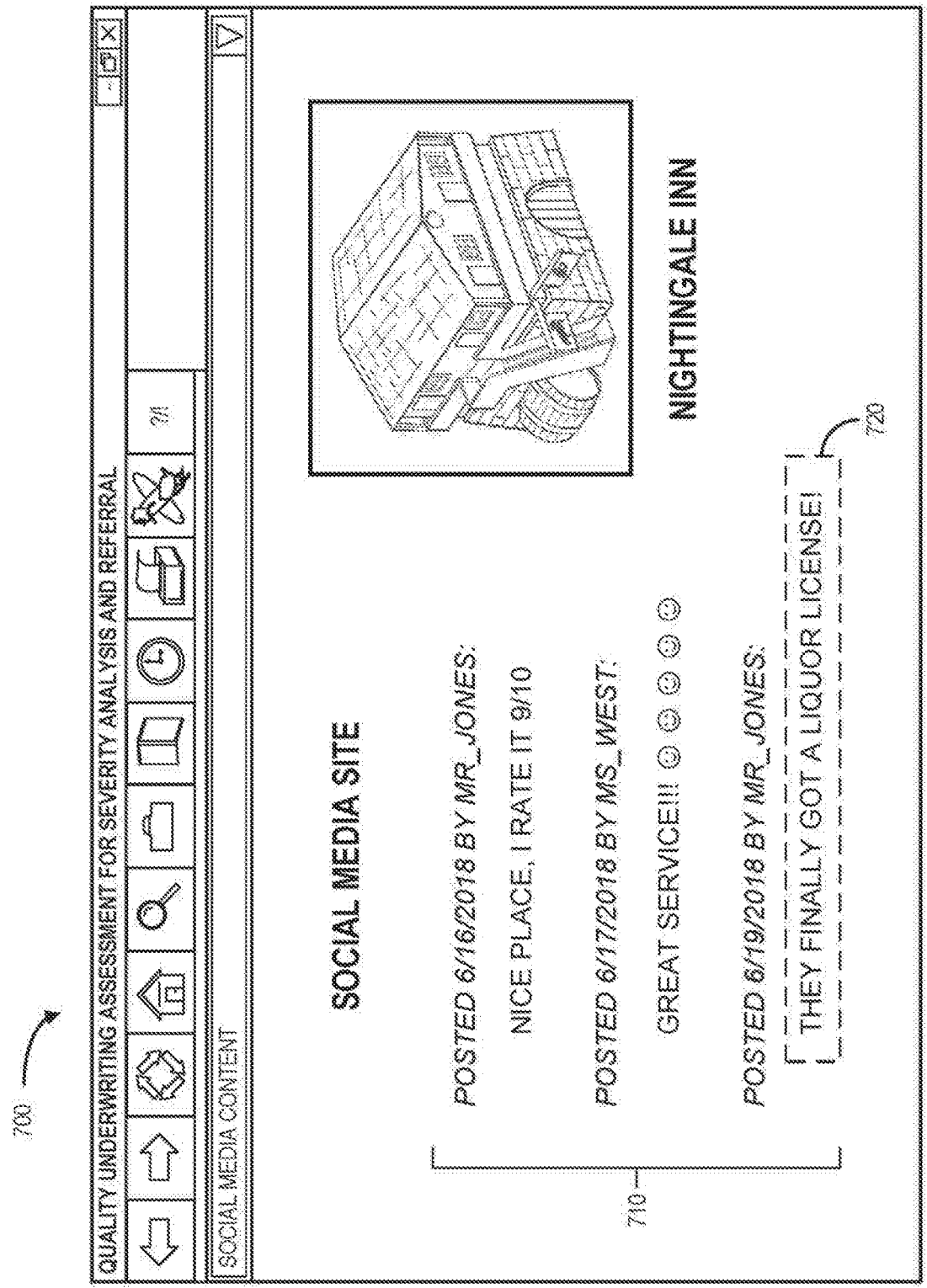

Referring again to FIG. 3, the back-end application computer server 350 may also collect information from other public records 346 (e.g., court documents, police records, etc.). According to some embodiments, the back-end application computer server 350 may also collect information from an external, third-party data element source input, such as social media content 348. Consider, for example, FIG. 7 which illustrates a social media site display 700 wherein people may post text and image information 710 about an establishment. Note that the data elements in the display 700 may be "unstructured" in that various elements (e.g., text and images) may not be located at pre-determined positions or locations within the display 700. Instead, the system may automatically search for and discover risk related information (e.g., the fact that the company has recently been granted a liquor license to sell alcohol) and use the detected information 720 when executing the risk model. Note that information from product and/or service review sites might be used instead of, or in addition to, social media content.

Figure 8:
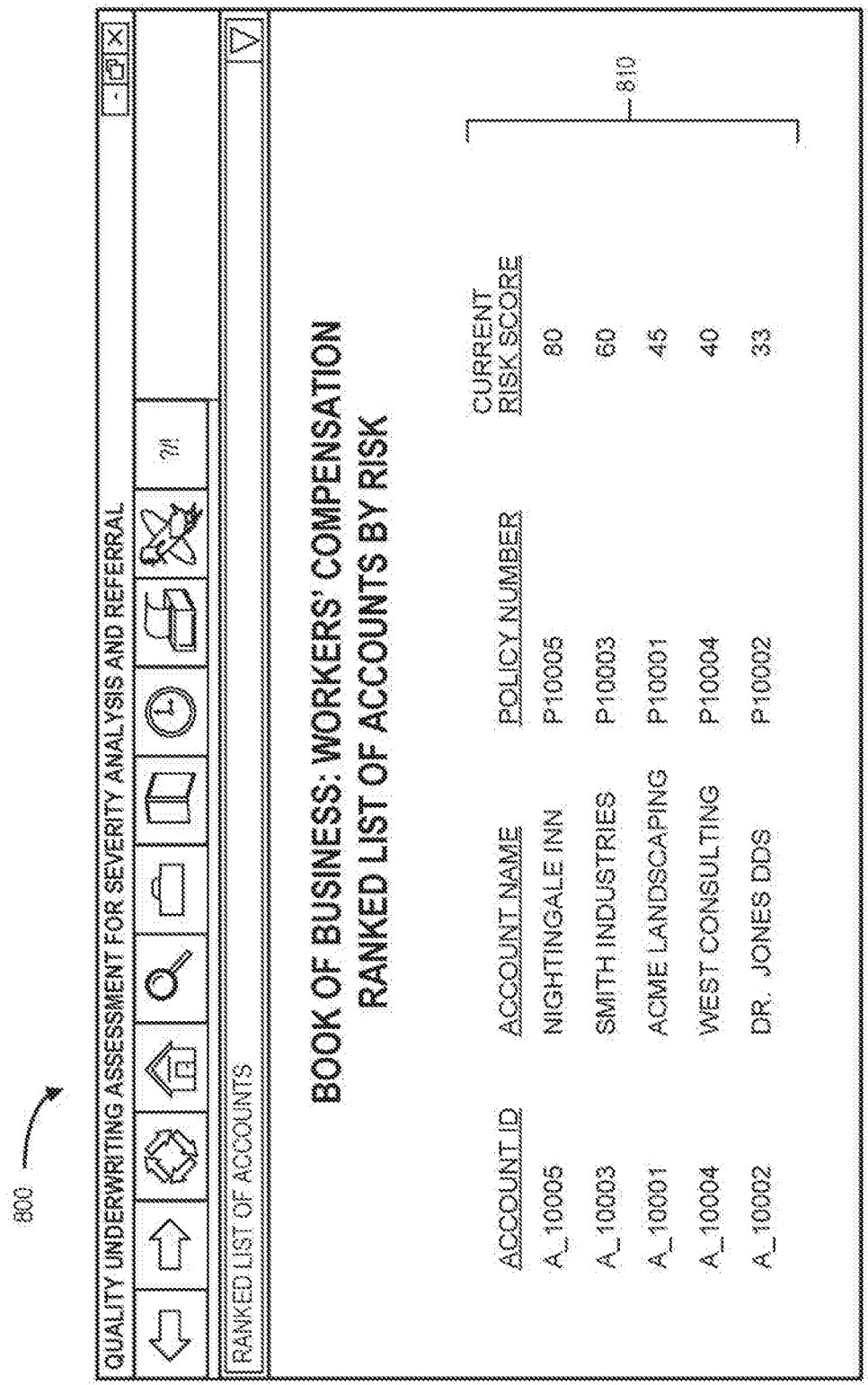

Referring again to FIG. 3, the risk model 330 may then be executed and results may be provided to the schedule task manager at (4). Consider, for example, FIG. 8 which illustrates a risk score result display 800 for an insurer's book of business. Note that the risk score results 810 might include a numerical value for each account (e.g., a current risk score of 80, 60, 45, etc.) and/or a ranked list of accounts (from highest-to-lowest risk or lowest-to-highest risk).

Figure 9:
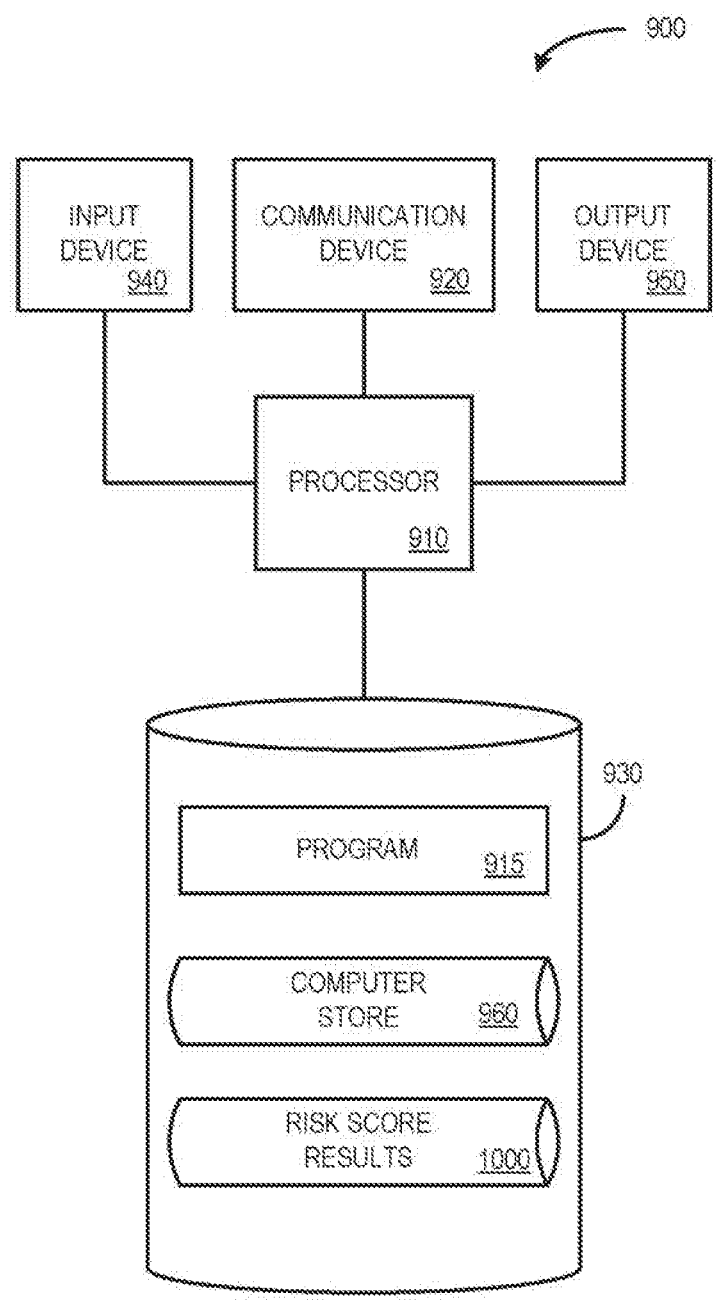
FIG. 9 is a block diagram of an apparatus in accordance with some embodiments of the present invention.

The embodiments described herein may be implemented using any number of different hardware configurations. For example, FIG. 9 illustrates a back-end application computer server 900 that may be, for example, associated with the systems 100, 300 of FIGS. 1 and 3, respectively. The back-end application computer server 900 comprises a processor 910, such as one or more commercially available Central Processing Units ("CPUs") in the form of one-chip microprocessors, coupled to a communication device 920 configured to communicate via a communication network (not shown in FIG. 9). The communication device 920 may be used to communicate, for example, with one or more remote administrator computers. Note that communications exchanged via the communication device 920 may utilize security features, such as those between a public internet user and an internal network of the insurance enterprise. The security features might be associated with, for example, web servers, firewalls, and/or PCI infrastructure. The back-end application computer server 900 further includes an input device 940 (e.g., a mouse and/or keyboard to enter information about risk scoring rules or business logic, historic information, predictive models, etc.) and an output device 950 (e.g., to output reports regarding system administration, risk recommendations, and/or insured parties).

The processor 910 also communicates with a storage device 930. The storage device 930 may comprise any appropriate information storage device, including combinations of magnetic storage devices (e.g., a hard disk drive), optical storage devices, mobile telephones, and/or semiconductor memory devices. The storage device 930 stores a program 915 and/or a risk evaluation tool or application for controlling the processor 910. The processor 910 performs instructions of the program 915, and thereby operates in accordance with any of the embodiments described herein. For example, the processor 910 may access a data store containing electronic files associated with a set of entities to retrieve, for each of a plurality of the entities in the set of entities, electronic files associated with that entity. The processor 910 may also retrieve structured data elements, unstructured data elements, and/or external, third-party data elements for that entity. The processor 910 may then execute an automated risk model to assign a risk score to that entity based on the electronic files, the structured data elements, the unstructured data elements, and the external, third-party data elements for that entity and transmit indications of the risk scores for the plurality of entities.

The program 915 may be stored in a compressed, uncompiled and/or encrypted format. The program 915 may furthermore include other program elements, such as an operating system, a database management system, and/or device drivers used by the processor 910 to interface with peripheral devices.

As used herein, information may be "received" by or "transmitted" to, for example: (i) the back-end application computer server 900 from another device; or (ii) a software application or module within the back-end application computer server 900 from another software application, module, or any other source.

In some embodiments (such as shown in FIG. 9), the storage device 930 further stores a computer store 960 (e.g., associated with a book of business and past policy submissions, underwriting decisions, premiums, claims, damages, etc.) and a risk score results database 1000. An example of a database that might be used in connection with the back-end application computer server 900 will now be described in detail with respect to FIG. 10. Note that the database described herein is only an example, and additional and/or different information may be stored therein. Moreover, various databases might be split or combined in accordance with any of the embodiments described herein. For example, the computer store 960 and/or risk score results database 1000 might be combined and/or linked to each other within the program 915.

Figure 10:
FIG. 10 is a portion of a tabular database storing risk score results in accordance with some embodiments.

Referring to FIG. 10, a table is shown that represents the risk score results database 1000 that may be stored at the back-end application computer server 900 according to some embodiments. The table may include, for example, entries identifying accounts in an insurer's book of business. The table may also define fields 1002, 1004, 1006, 1008, 1010, 1012 for each of the entries. The fields 1002, 1004, 1006, 1008, 1010, 1012 may, according to some embodiments, specify: an account identifier 1002, an account name 1004, an insurance policy number 1006, an insurance type 1008, source input data elements 1010, and a risk score

1012. The risk score results database 1000 may be created and updated, for example, based on information electrically received from a computer store and one or more source inputs.

The account identifier 1002 may be, for example, a unique alphanumeric code identifying an insured party, and the account name 1004 and the insurance policy number 1006 may be associated with that party. The insurance type 1008 may be used to define an insurer's book of business (e.g., for workers' compensation, commercial automobile, etc.). The source input data elements 1010 may represent, for example, information that was found from structured source, unstructured sources, social media content, etc. that may increase (or decrease) the likelihood that the account may cause a substantial loss to the insurer. The risk score 1012 might represent numeric value, category (red, yellow, green), an overall ranking, etc., representing an amount of risk associated with the account identifier 1002.

Figure 11:
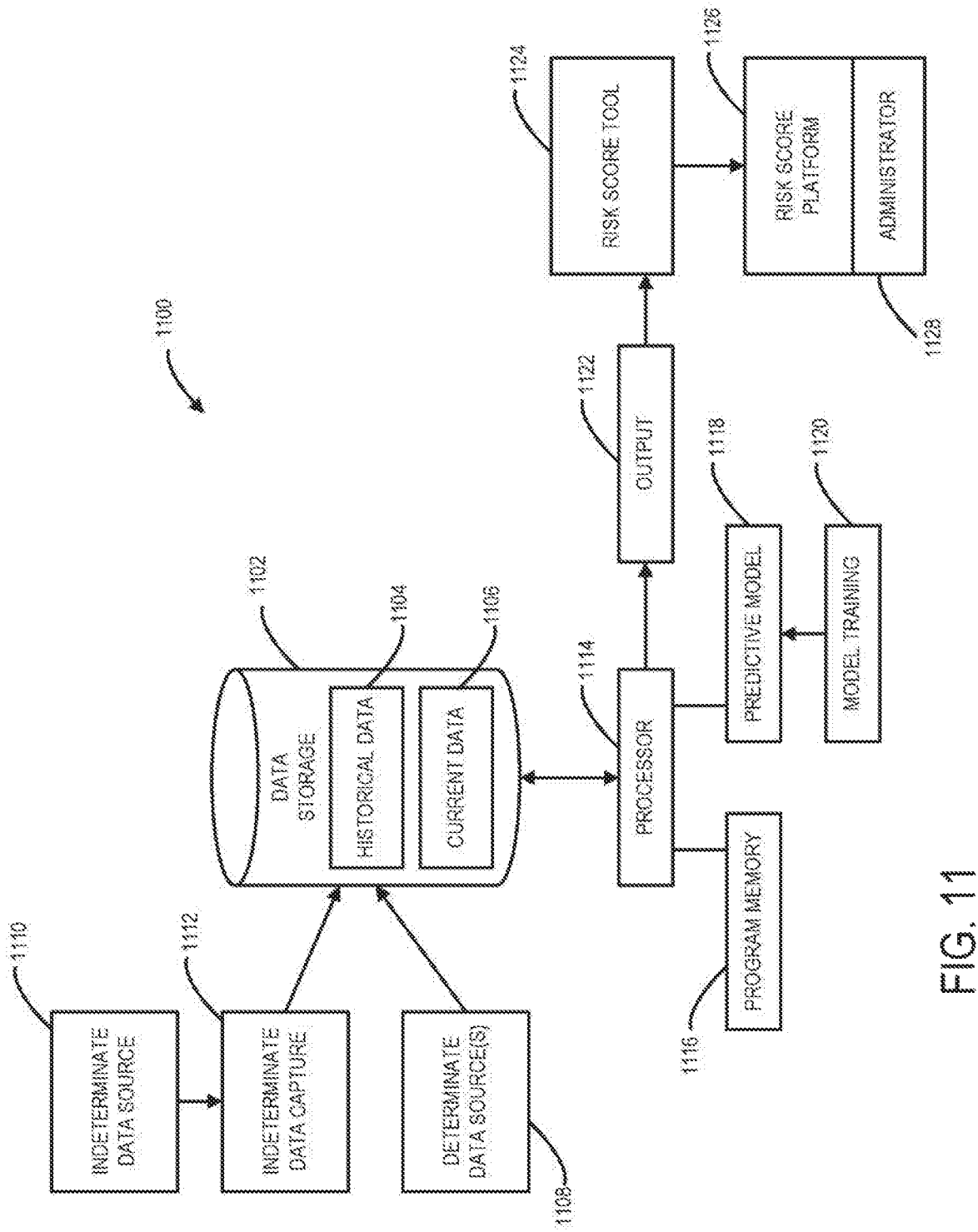
FIG. 11 illustrates a system having a predictive model in accordance with some embodiments.

According to some embodiments, one or more predictive models may be used to select and/or score risk information (e.g., the risk score 1012 in the risk score results database 1000). Features of some embodiments associated with a predictive model will now be described by first referring to FIG. 11. FIG. 11 is a partially functional block diagram that illustrates aspects of a computer system 1100 provided in accordance with some embodiments of the invention. For present purposes it will be assumed that the computer system 1100 is operated by an insurance company (not separately shown) for the purpose of supporting automated insurance agency evaluations (e.g., assigning risk scores to accounts in an insurer's book of business).

The computer system 1100 includes a data storage module 1102. In terms of its hardware the data storage module 1102 may be conventional, and may be composed, for example, by one or more magnetic hard disk drives. A function performed by the data storage module 1102 in the computer system 1100 is to receive, store and provide access to both historical transaction data (reference numeral 1104) and current transaction data (reference numeral 1106). As described in more detail below, the historical transaction data 1104 is employed to train a predictive model to provide an output that indicates an identified performance metric and/or an algorithm to score risk factors, and the current transaction data 1106 is thereafter analyzed by the predictive model. Moreover, as time goes by, and results become known from processing current transactions, at least some of the current transactions may be used to perform further training of the predictive model. Consequently, the predictive model may thereby adapt itself to changing conditions.

Either the historical transaction data 1104 or the current transaction data 1106 might include, according to some embodiments, determinate and indeterminate data. As used herein and in the appended claims, "determinate data" refers to verifiable facts such as the an age of a home; an automobile type; a policy date or other date; a driver age; a time of day; a day of the week; a geographic location, address or ZIP code; and a policy number.

As used herein, "indeterminate data" refers to data or other information that is not in a predetermined format and/or location in a data record or data form. Examples of indeterminate data include narrative speech or text, information in descriptive notes fields and signal characteristics in audible voice data files.

The determinate data may come from one or more determinate data sources 1108 that are included in the computer system 1100 and are coupled to the data storage module 1102. The determinate data may include "hard" data like a claimant's name, date of birth, social security number, policy number, address, an underwriter decision, etc. One possible source of the determinate data may be the insurance company's policy database (not separately indicated).

The indeterminate data may originate from one or more indeterminate data sources 1110, and may be extracted from raw files or the like by one or more indeterminate data capture modules 1112. Both the indeterminate data source(s) 1110 and the indeterminate data capture module(s) 1112 may be included in the computer system 1100 and coupled directly or indirectly to the data storage module 1102. Examples of the indeterminate data source(s) 1110 may include data storage facilities for document images, for text files, and digitized recorded voice files. Examples of the indeterminate data capture module(s) 1112 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual.

The computer system 1100 also may include a computer processor 1114. The computer processor 1114 may include one or more conventional microprocessors and may operate to execute programmed instructions to provide functionality as described herein. Among other functions, the computer processor 1114 may store and retrieve historical insurance transaction data 1104 and current transaction data 1106 in and from the data storage module 1102. Thus the computer processor 1114 may be coupled to the data storage module 1102.

The computer system 1100 may further include a program memory 1116 that is coupled to the computer processor 1114. The program memory 1116 may include one or more fixed storage devices, such as one or more hard disk drives, and one or more volatile storage devices, such as RAM devices. The program memory 1116 may be at least partially integrated with the data storage module 1102. The program memory 1116 may store one or more application programs, an operating system, device drivers, etc., all of which may contain program instruction steps for execution by the computer processor 1114.

The computer system 1100 further includes a predictive model component 1118. In certain practical embodiments of the computer system 1100, the predictive model component 1118 may effectively be implemented via the computer processor 1114, one or more application programs stored in the program memory 1116, and computer stored as a result of training operations based on the historical transaction data 1104 (and possibly also data received from a third party). In some embodiments, data arising from model training may be stored in the data storage module 1102, or in a separate computer store (not separately shown). A function of the predictive model component 1118 may be to determine appropriate risk parameters and/or scoring algorithms. The predictive model component may be directly or indirectly coupled to the data storage module 1102.

The predictive model component 1118 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 1100 includes a model training component 1120. The model training component 1120 may be coupled to the computer processor 1114 (directly or indirectly) and may have the function of training the predictive model component 1118 based on the historical transaction data 1104 and/or information about potential insureds. (As will be understood from previous discussion, the model training component 1120 may further train the predictive model component 1118 as further relevant data becomes available.) The model training component 1120 may be embodied at least in part by the computer processor 1114 and one or more application programs stored in the program memory 1116. Thus, the training of the predictive model component 1118 by the model training component 1120 may occur in accordance with program instructions stored in the program memory 1116 and executed by the computer processor 1114.

In addition, the computer system 1100 may include an output device 1122. The output device 1122 may be coupled to the computer processor 1114. A function of the output device 1122 may be to provide an output that is indicative of (as determined by the trained predictive model component 1118) particular performance metrics and/or evaluation results. The output may be generated by the computer processor 1114 in accordance with program instructions stored in the program memory 1116 and executed by the computer processor 1114. More specifically, the output may be generated by the computer processor 1114 in response to applying the data for the current simulation to the trained predictive model component 1118. The output may, for example, be a numerical estimate and/or likelihood within a predetermined range of numbers. In some embodiments, the output device may be implemented by a suitable program or program module executed by the computer processor 1114 in response to operation of the predictive model component 1118.

Still further, the computer system 1100 may include a risk score tool module 1124. The risk score tool module 1124 may be implemented in some embodiments by a software module executed by the computer processor 1114. The risk score tool module 1124 may have the function of rendering a portion of the display on the output device 1122. Thus, the risk score tool module 1124 may be coupled, at least functionally, to the output device 1122. In some embodiments, for example, the risk score tool module 1124 may direct workflow by referring, to an administrator 1128 via risk score platform 1226, current risk score results generated by the predictive model component 1118 and found to be associated with various insurance accounts in an insurer's book of business. In some embodiments, these recommendations may be provided to an administrator 1128 who may also be tasked with determining whether or not the results may be improved (e.g., by having a risk mitigation team visit a factory associated with a particularly risky account).

Thus, embodiments may provide an automated and efficient way to provide a risk scoring system for an insurer's book of business. Consider, for example, a review of an automobile insurance book of business that includes large losses totaling millions of dollars from accidents that occurred in a certain time period. A review of unstructured data imbedded in underwriting documents might have identified a certain percentage of the policies that should have not been written based on a poor loss history, poor driver qualities, high hazard automobiles, a lack of a safety program, etc. The potentially avoided losses might be worth several million dollars, while the premiums were valued at a portion of that amount—resulting in a potential net income of avoided losses minus the premium value (representing a certain loss per accident).

Or consider a book of business having many large automobile insurance losses each year and, upon further review, it is found that a certain percentage of those losses could be avoided with heightened scrutiny. In this example, the net income loss time the number of claims per year could be millions of dollars for the automobile book of business.

As another example, consider a workers' compensation book of business that experiences hundreds of large losses per year, each having an average value of several hundred thousand dollars. Note that the tendency for workers' compensation large losses is to escalate over time as medical care matures requiring significant portions of the Incurred But Not Reported ("IBNR") to be allocated to these claims. For the purposes of analysis, assume that the net income ratio is similar to that of the automobile book of business previously described. The net income per claim will then be some portion of the average value of large losses. Assuming that risk score results can help avoid the inappropriate writing of a certain percentage of these claims, the insurer may have an opportunity to save millions of dollars per year.

According to some embodiments, a combined opportunity of an automobile and workers' compensation initiatives may represent tens of millions of dollars plus the IBNR load for the workers' compensation line. Although a review of cases may result in some high risk accounts (that would not have actually generated a large loss) being removed from the books, this is likely offset by the IBNR issue. The major remaining variable is the ability of an automated tool to identify high potential severity risks. Assuming the automated risk model can help identify half of the potential accounts, the proposed benefit of the model might comprise half of the combined opportunity of initiatives. If this approach can be applied to the property and general liability insurance, the opportunity may be larger. This approach may also be leveraged across segments and potentially to group benefits and personal lines.

Note that, in general, a certain percentage of reviewed accounts fail on a key risk/reward evaluation conducted during a quality review. The risk/reward review may comprise, for example, an evaluation of whether the account provides enough premium for the potential risk. The most common reason for an account to miss the mark on a risk/reward analysis is a lack of documentation. Lack of documentation presents material concerns because it may indicate an insufficient investigation. Moreover, risk characteristics with significant potential to generate severe losses might not be uncovered during a cursory investigation. It is contemplated that some risks will be marked as fine, some as questionable, and some as unacceptable at any price by the system.

Embodiments described herein may provide a system that can evaluate every open account, on a regular basis, to determine which accounts are most likely to generate significant losses. Ideally, accounts that are scored can also be used to improve a quality review process by an insurer's home office and/or field staff. Such an approach may positively impact the risk profile of a book of business letting the staff spend additional time working on more complicated files.

According to some embodiments, each account in the insurer's book of business will receive a score and thresholds may automatically trigger review by underwriting and quality staff. Files that score with the highest likelihood of generating a significant loss may be reviewed and actions will be taken as appropriate. Note that rules generated by the system might be combined with business rules. Using these in combination may create an opportunity to handle both high and low potential severity accounts. High potential severity accounts may be referred to an underwriting unit responsible including the home office referral underwriter. Additionally, referrals may be provided to a quality team for review. Low potential severity account lists may be provided to underwriting staff in an effort to improve efficiency (e.g., by not overworking relatively low-risk accounts). The rules generated by the model can also help to assign account level risk profiles by line of business (workers' compensation, automobile insurance, etc.). These profiles will enable reserving to better evaluate the risk load for the book of business, as well as guide underwriting and the development of premium indications both in a home office and the field.

According to some embodiments, a quality team uses a report on structured data to help select the most appropriate accounts for review. The report may contain a variety of structured data elements that can help to identify drivers of severity.

Another source of relevant underwriting information that may help to predict severity resides in a risk evaluation document. The risk evaluation document may be a required document generally completed before or shortly after binding a policy. The information present in the risk evaluation document may be unstructured and require text mining applications to identify triggers or flags in the documentation.

As another example, a risk engineering survey may represent a comprehensive survey on a subset of risks as requested by underwriting staff. Note that a greater amount of detail may be present in the surveys as compared to what is ultimately documented in the risk evaluation document. From a large loss review process, it may be estimated that 33% loss control had open recommendations for these policies. When this finding was compared with other policies with smaller business insurance losses, the open recommendations in the loss control report were twice as frequent (33% as compared to 16%). Open recommendations in risk engineering surveys may present a significant opportunity to identify potential severity.

As still another example, claims notes may contain information likely that will help to identify unsuitable risks (e.g., that have a claim history). Note that claims notes may typically be stored in a minable database.

As yet another example, web "crawling" technology exists that can obtain text from websites that might raise underwriting concerns. When this process is automated, it may serve as a significant competitive advantage due to the incorporation of useful data that does not currently exist in underwriter notes.

As another approach, a system might use a cloud-based advanced data analytics platform to conduct a Natural Language Process ("NLP") analysis to identify accounts that are likely to result in a failing grade for the risk/reward analysis.

Thus, embodiments may help identify potential large loss claim accounts with unacceptable risk characteristics. For example, a scoring tool may automatically identify accounts with high potential severity using internal data, external data, text mining, etc. Some embodiments may be associated with an underwriting application and/or a quality/referral application that provides continuous monitoring and management of book quality to reduce unacceptable risks.

An underwriting application may, according to some embodiments, comprise a front-end application that provides premium indications and flags to help reduce underwriting time and help ensure consistency (similar research will be performed during risk analysis). The underwriting application may provide benchmark information by providing risk profile information as compared to similar accounts. Some of the information examined by any of the embodiments described herein might include, for example, one or more of a company profile, an industry code, an employee or employer address, a measurement of litigiousness, financial information, average wage information, credit report information, actuarial data, an audio file of a Chief Executive Officer's comments made during a teleconference with investors (e.g., in accordance to automated speech-to-text processing), data from social media cites (e.g., may employees are discussing potential layoffs), etc. Note that different types of information may be combined (e.g., after being given different weights as appropriate) to improve the accuracy of the system.

Figure 12:
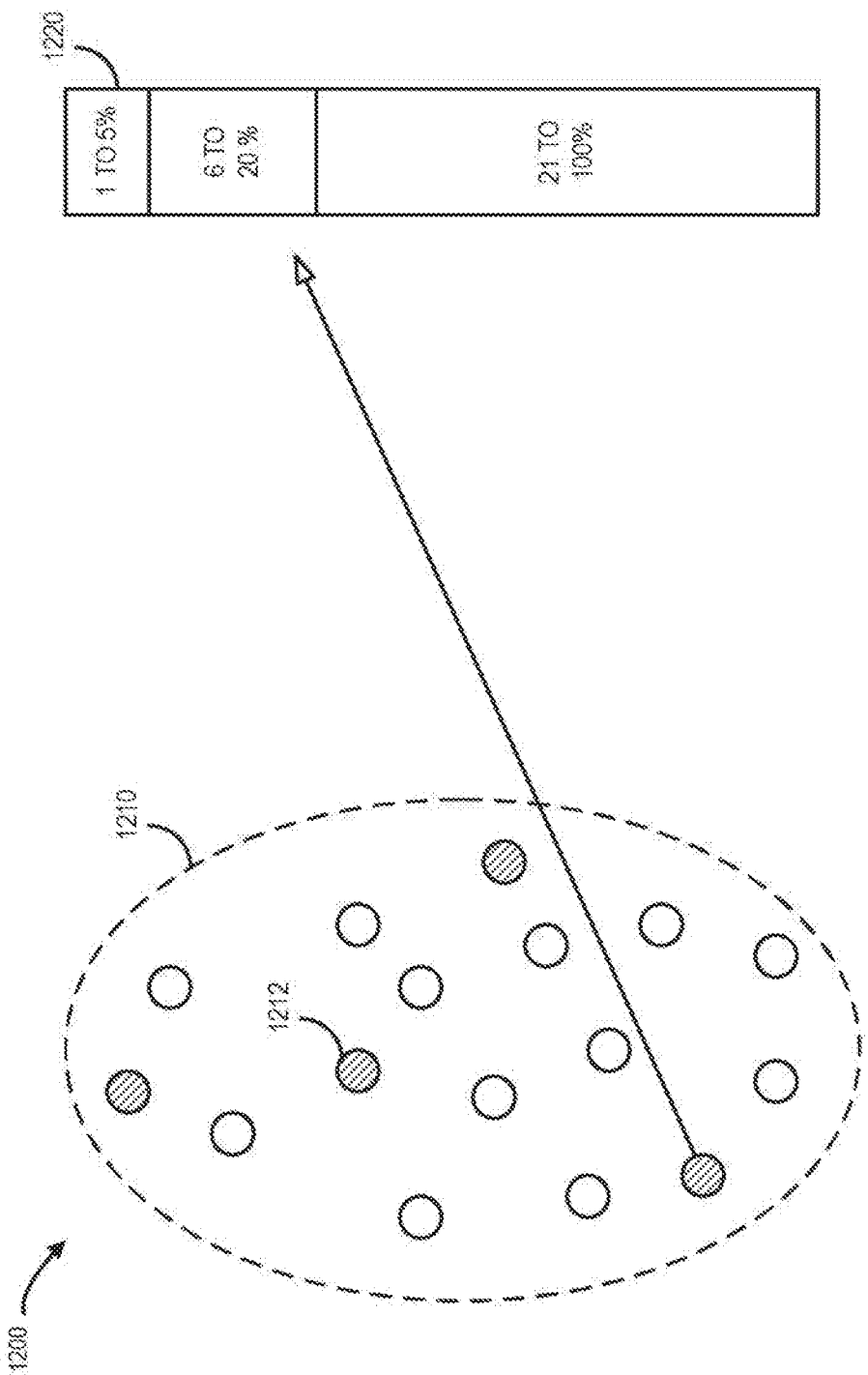
FIG. 12 is an example of a book of business view according to some embodiments.

A quality/referral application may provide a book-of-business view using a risk score model tuned to frequency, premium indication, and/or structured data. The quality/referral application may predict a likelihood of a large loss using a proactive and repeatable method to examine structured and unstructured data. FIG. 12 is an example of a book of business view 1200 according to some embodiments. In particular, a book of business 1210 may include a number of separate accounts 1212 that may be reviewed and assigned to a risk category 1220 such as: (i) a low large loss risk potential category representing the safest 80% of accounts, (ii) a high large loss risk potential category representing the least safe 5% of accounts, and (iii) a moderate large loss risk potential category representing the remaining accounts.

Figure 13:
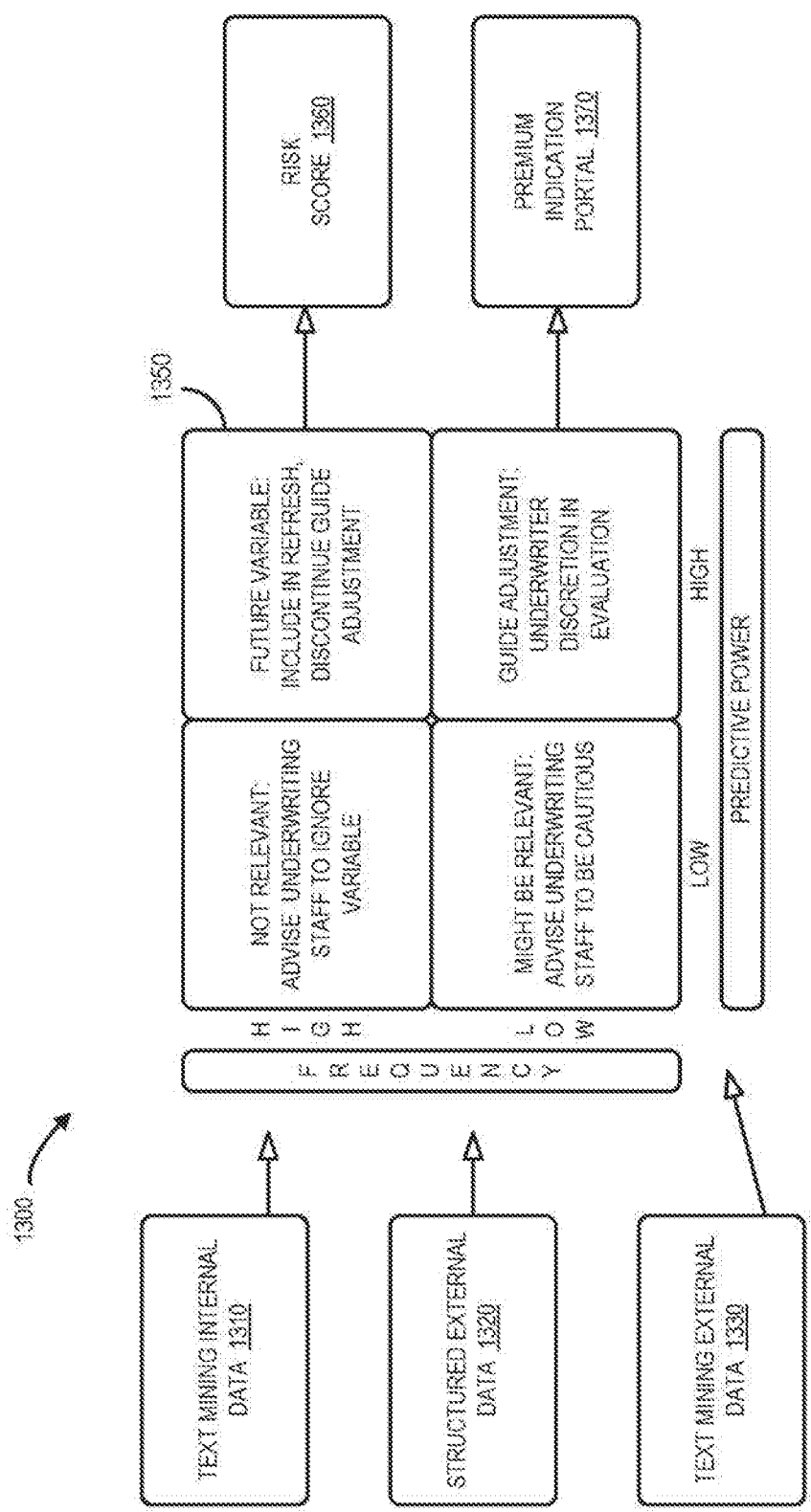
FIG. 13 illustrates a new variable proving ground in accordance with some embodiments.

According to some embodiments, external open data and/or restricted data may be evaluated. Open data might comprise, for example, information with no restrictions on usage, such as newspapers, municipal web sites, insured web sites, governmental agencies, etc. Restricted data might include, for example, social networking web sites, customer review web sites, indexes of communication addresses, etc. FIG. 13 illustrates a new variable proving ground 1300 in accordance with some embodiments. The proving ground 1300 may input text mining internal data 1310, structured external data 1320, and text mining external data 1330. Moreover a scoring matrix 1350 may rate data in terms of input frequency (high or low) and predictive power (high or low) and provide an output to a risk score 1360 and/or a premium indication portal 1370. The scoring matrix 1350, according to some embodiments, may categorize: (i) high frequency, low predictive power data as being not particularly relevant, (ii) low frequency, low predictive power data as recommending that underwriting staff be cautious, (iii) high frequency, high predictive power data as recommending that guide adjustment be discontinued, and (iv) low frequency, high predictive power data as needing underwriter discretion (e.g., a manager's approval might be required).

Figure 14:
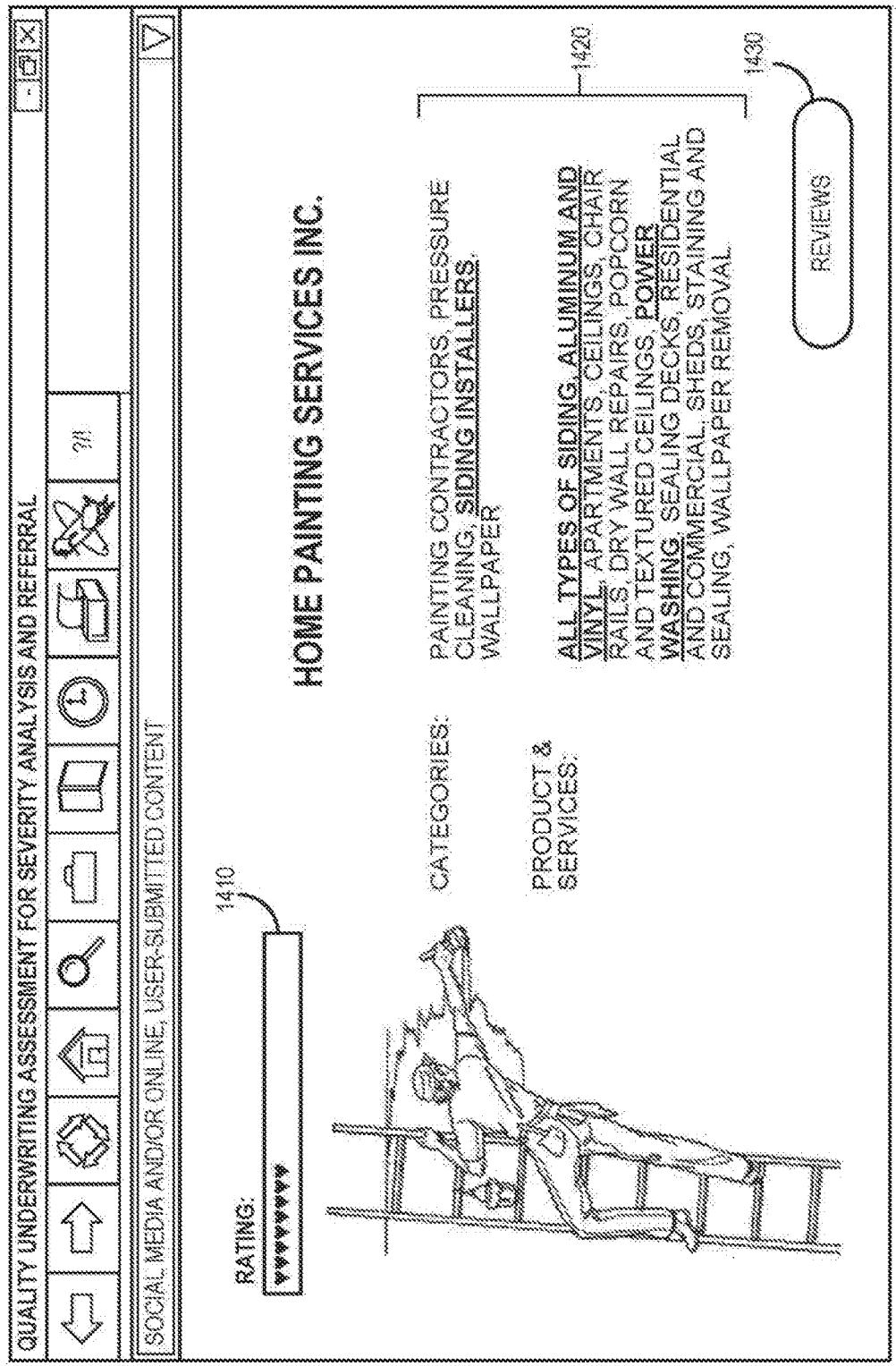
FIG. 14 is associated with a large workers' compensation loss on an out-of-appetite risk according to some embodiments.

According to some embodiments, the system may be continuously monitoring and rating accounts. Consider, for example, a workers' compensation book-of-business that includes a number of painting contractors. Moreover, an insurer might not have an appetite to insure contractors who spend a substantial amount of time on ladders working on a building's exterior (e.g., because of the potential large losses that might be associated with an employee falling off of a ladder). FIG. 14 is associated with a large workers' compensation loss on an out-of-appetite risk 1400 according to some embodiments. In this example, a rating 1410 web site might be automatically accessed by the system. Moreover, text-based details 1420 about a particular contractor might be analyzed looking for particular key words and/or phrases. As illustrated in FIG. 1420, the underlined text might represent words and phrases that cause the system to automatically raise a risk flag. Similarly, the system might automatically access and analysis customer reviews 1430 submitted about the contractor. Note that other information may also be analyzed by the system. For example, drone or satellite information might be used to determine a type of roof associated with a particular customer, text mining might be performed on safety inspection reports, claim handler notes, etc.

Figure 15:
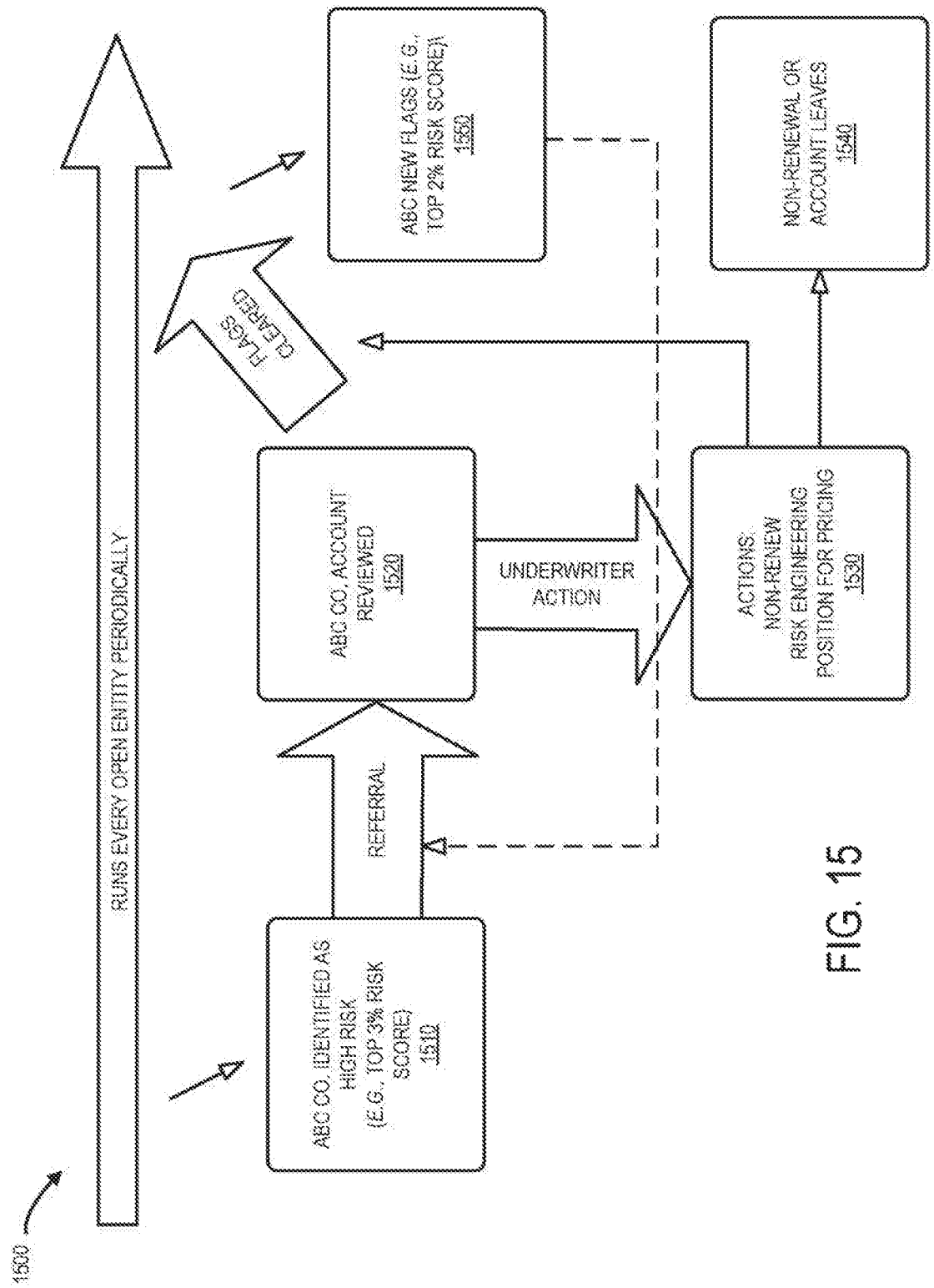
FIG. 15 illustrates a period execution of a risk review implementation according to some embodiments.

Note that the system might review accounts on a periodic basis (e.g., once per week) or in substantially real time (e.g., the system might continuously look for, and analyze, information about accounts). FIG. 15 illustrates a periodic execution of a risk review implementation 1500 according to some embodiments. In this example, a company might be automatically identified as a high risk at 1510. This might automatically result in a referral of the account (e.g., to a risk manager). The account may be reviewed at 1520 and, if appropriate, actions may be taken at 1530 (e.g., non-renewal of an account, risk engineering recommendations) until the account is closed at 1540. If such steps are not appropriate (e.g., the originally raised flag were, upon further inspection, found to be harmless), the flags may be cleared and the account may continue to be monitored until new risks are automatically identified at 1550.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 16:
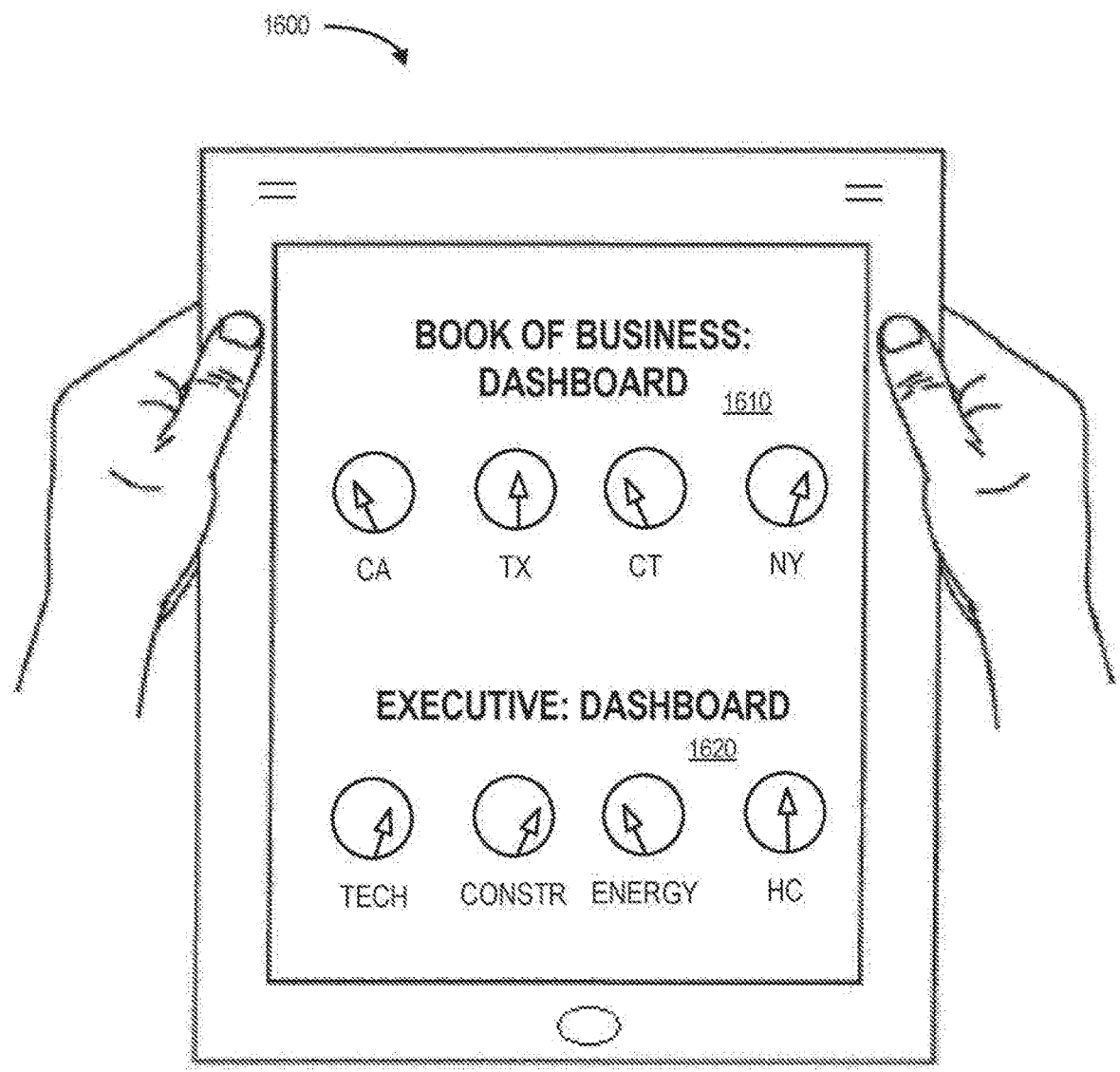
FIG. 16 illustrates a tablet computer displaying risk score dashboard information according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of insurance policies, embodiments may instead be associated with other types of insurance. Still further, the displays and devices illustrated herein are only provided as examples, and embodiments may be associated with any other types of user interfaces. For example, FIG. 16 illustrates a handheld risk score dashboard display 1600 according to some embodiments. The dashboard display 1600 might include graphical icons providing information about a book of business based on geographic location 1610 and/or an executive dashboard area displaying information by industry 1620. According to some embodiments, the display 1600 might let a user drill down to the account, state, industry, office, or underwrite level to better understand a book of business. In some embodiments, an entire book of business might be assigned an overall riskiness score, and user might access the display 1600 to determine what that score means.

Figure 17:
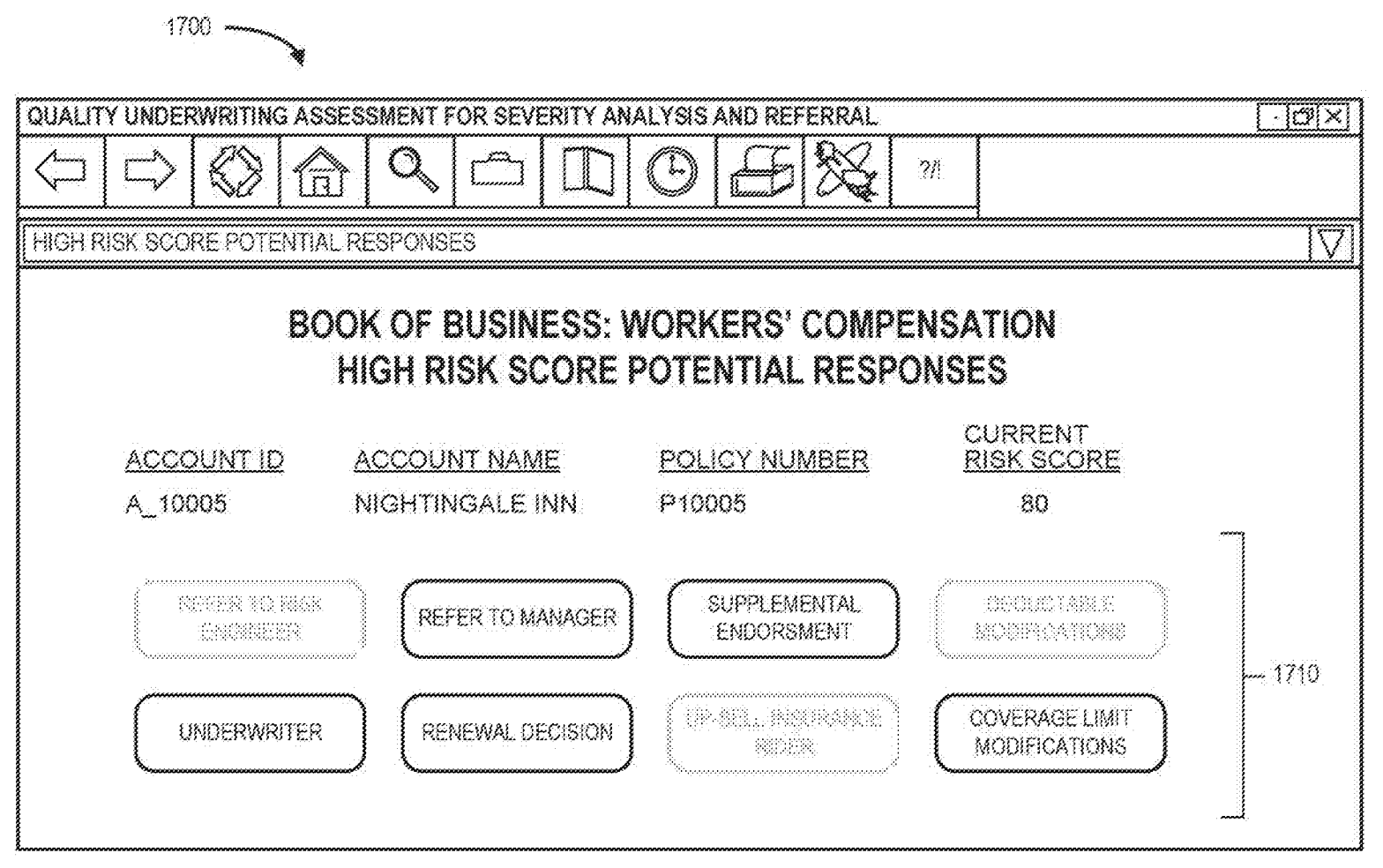

According to some embodiments, risk score results might be used by auditors, underwrites, risk engineers, etc. The risk core results might be used, for example, to help determining an appropriate premium, identify fraud, make renewal decisions, identify a need for a manual, telephonic or paper audit, assign risk engineering resources, influence broker/agent interactions and commission arrangements, adjust risk model parameters and assumptions, recommend deductibles and/or policy limits, make proactive offers (e.g., recommended insurance riders or endorsements to tailor coverage as appropriate), etc. Consider, for example, FIG. 17 illustrates a potential response display 1700 that might be presented in connection with a high risk score account in a workers' compensation book of business. The display 1700 might include several user-selectable options 1710 to respond the account's high level of risk. The options 1710 might include, for example, referring the account to a manager, modifying coverage limits, altering a renewal decision, etc. According to some embodiments, a set of available options 1710 might be automatically determined by the system as appropriate (e.g., as represented by the non-appropriate options being displayed as "grayed out" in FIG. 17).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer system, comprising:
   a communication device coupled to a communication network to communicate with one or more electronic data source inputs;
   a data storage device storing electronic data files associated with a plurality of entities; and
   an application computer server, coupled to the communication device and the data storage device, the application computer server comprising one or more computer processors and a program memory in communication with the one or more processors, the program memory storing one or more application programs having instructions which, when executed by the one or more processors, cause the application computer server to:
   for each of the plurality of entities, access the electronic files, stored in the data storage device, associated with that entity,
   retrieve data elements related to that entity from the one or more electronic data source inputs;
   determine at least one variable associated with an automated risk model, the at least one variable being assigned a predictive quality based at least in part on an input frequency over time of the variable, using a variable proving ground tool comprising a scoring matrix configured to rate variables based on at least input frequency over time,
   execute the automated risk model to assign a risk score to that entity based on the at least one variable, the electronic files and the data elements related to that entity, and
   transmit indications of the risk scores for the plurality of entities.

2. The system of claim 1, wherein the communication device is configured to receive data from a structured data element information source input; an unstructured data element information source input; and an external, third-party data element information source input, and the instructions cause the application computer server to retrieve structured data elements, unstructured data elements and third-party data elements for that entity from the structured data element information source input, the unstructured data element information source input, and the third-party data element information source input, respectively.

3. The system of claim 1, wherein the scoring matrix is further configured to rate variables based on predictive power.

4. The system of claim 3, wherein the scoring matrix is configured to categorize: (i) high frequency, low predictive power variables as being not particularly relevant, (ii) low frequency, low predictive power variables as recommending that underwriting staff be cautious, (iii) high frequency, high predictive power variables as recommending that adjustment of the variables based upon underwriter discretion be discontinued, and (iv) low frequency, high predictive power variables as needing adjustment of the variables based upon underwriter discretion.

5. The system of claim 1, further comprising a remote schedule task manager in communication with the application computer server and configured to automatically request information on a periodic basis.

6. The system of claim 1, wherein the data sources comprise a structured data element source.

7. The system of claim 6, wherein the structured data element source has a display, and the application computer server stores data indicative of correlations between pre-determined locations on the display and types of data elements.

8. The system of claim 1, wherein the data sources comprise an unstructured data element source.

9. The system of claim 8, wherein the unstructured data element source comprises a web page of an entity, and the unstructured data elements comprise text and image data extracted from the web page of the entity.

10. The system of claim 1, wherein the instructions further cause the application computer server to execute the automated risk model on a periodic basis to update the risk score responsive to data elements for that entity received subsequent to a prior execution of the automated risk model.

11. A computer-implemented method, comprising:
accessing, by one or more processors of an application computer server, electronic files associated with an entity from a data storage device storing electronic data files associated with a plurality of entities;
retrieving, by the one or more processors of the application computer server, via a communication device, data elements related to the entity from one or more electronic data source inputs;
determining, by the one or more processors of the application computer server, at least one variable associated with an automated risk model, the at least one variable being assigned a predictive quality based at least in part on an input frequency over time of the variable, using a variable proving ground tool comprising a scoring matrix configured to rate variables based on at least input frequency over time;
executing, by the one or more processors of the application computer server, the automated risk model to assign a risk score to the entity based on the at least one variable, the electronic files and the data elements related to the entity; and
transmitting, by the one or more processors of the application computer server, an indication of the risk score for the entity.

12. The computer-implemented method of claim 11, wherein the retrieving comprises retrieving structured data elements from a structured data element information source input; retrieving unstructured data elements from an unstructured data element information source input; and retrieving external, third-party data elements from an external, third-party data element information source input.

13. The computer-implemented method of claim 11, wherein the scoring matrix is further configured to rate variables based on predictive power.

14. The computer-implemented method of claim 13, wherein the scoring matrix is configured to categorize: (i) high frequency, low predictive power variables as being not particularly relevant, (ii) low frequency, low predictive power variables as recommending that underwriting staff be cautious, (iii) high frequency, high predictive power variables as recommending that adjustment of the variables based upon underwriter discretion be discontinued, and (iv) low frequency, high predictive power variables as needing adjustment of the variables based upon underwriter discretion.

15. The computer-implemented method of claim 11, further comprising automatically requesting, by a remote schedule task manager in communication with the application computer server, information on a periodic basis.

16. The computer-implemented method of claim 11, wherein the data sources comprise a structured data element source.

17. The computer-implemented method of claim 16, wherein the structured data element source input has a display, and the application computer server stores data indicative of correlations between pre-determined locations on the display of data elements and types of data elements.

18. The computer-implemented method of claim 11, wherein the data sources comprise an external, third party-data element source.

19. The computer-implemented method of claim 18, wherein the external, third-party data element source comprises at least one of a social media resource and a source of online, user-submitted review content.

20. The computer-implemented method of claim 11, further comprising executing the automated risk model on a periodic basis to update the risk score responsive to data elements for the entity received subsequent to a prior execution of the automated risk model.

* * * * *